(12) United States Patent
Kutlucinar

(10) Patent No.: US 6,796,124 B2
(45) Date of Patent: *Sep. 28, 2004

(54) SHAPE MEMORY ALLOY ACTUATORS FOR AIRCRAFT LANDING GEAR

(75) Inventor: Iskender Kutlucinar, Kensington, MD (US)

(73) Assignee: Emergency Warning Systems, Inc., Kensington, MD (US)

(*) Notice: Subject to any disclaimer, the term of this patent is extended or adjusted under 35 U.S.C. 154(b) by 29 days.

This patent is subject to a terminal disclaimer.

(21) Appl. No.: 10/072,562

(22) Filed: Feb. 11, 2002

(65) Prior Publication Data

US 2002/0092299 A1 Jul. 18, 2002

Related U.S. Application Data

(63) Continuation of application No. 09/764,117, filed on Jan. 19, 2001, now Pat. No. 6,367,253, which is a continuation-in-part of application No. 09/467,749, filed on Dec. 20, 1999, now Pat. No. 6,226,992.

(51) Int. Cl.[7] .............................................. F01B 29/10
(52) U.S. Cl. .................. 60/528; 60/527; 244/102 R; 244/102 A
(58) Field of Search ............... 60/528, 527; 244/100 R, 244/102 R, 102 A, 102 SL, 102 SS

(56) References Cited

U.S. PATENT DOCUMENTS

| | | |
|---|---|---|
| 3,213,606 A | 10/1965 | Martin et al. |
| 3,229,177 A | 1/1966 | Clarke |
| 3,303,642 A | 2/1967 | Lee, II |
| 3,317,135 A | 5/1967 | Feinberg |
| 4,027,479 A | 6/1977 | Cory |
| 4,665,334 A | 5/1987 | Jamieson |
| 4,932,210 A | 6/1990 | Julien et al. |
| 5,061,914 A | 10/1991 | Busch et al. |
| 5,348,462 A | 9/1994 | Cohen et al. |
| 5,543,678 A | 8/1996 | Hoiberg |
| 5,734,219 A | 3/1998 | Horski et al. |
| 5,742,106 A | 4/1998 | Muraji |
| 5,747,951 A | 5/1998 | Audren |
| 5,763,979 A | 6/1998 | Mukherjee et al. |
| 6,131,853 A | 10/2000 | Bauer et al. |
| 6,151,897 A | 11/2000 | Baumbick |
| 6,226,992 B1 | 5/2001 | Kutlucinar et al. |
| 6,367,253 B2 * | 4/2002 | Kutlucinar ................... 60/528 |

* cited by examiner

Primary Examiner—Hoang Nguyen
(74) Attorney, Agent, or Firm—Kenyon & Kenyon

(57) ABSTRACT

Shape memory alloy actuators for aircraft landing gear are provided. In one embodiment a retractable aircraft landing gear system is provided. This embodiment includes a shape memory spring strut having a first end and a second end wherein the shape memory spring strut is extendable from a first length to a second length and the shape memory spring strut contains a shape memory alloy. This embodiment also includes a shape memory spring strut activation line connected to the shape memory spring strut wherein the shape memory spring strut activation line may be configured to activate the shape memory spring strut and a longitudinal connecting member having a first segment and a second segment wherein the first segment is in pivotal contact with the first end of the shape memory spring strut and the second segment supports a wheel rotatably mounted on a pin. The connecting member may be moveable along a line of travel from an extended position to a retracted position in this embodiment.

20 Claims, 39 Drawing Sheets

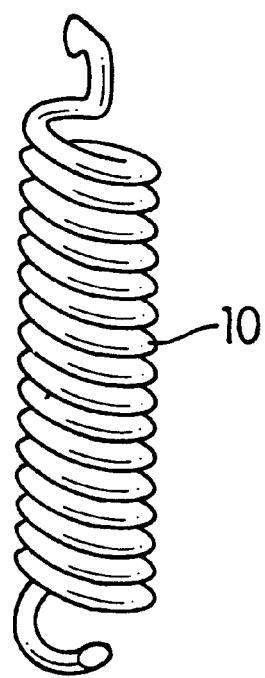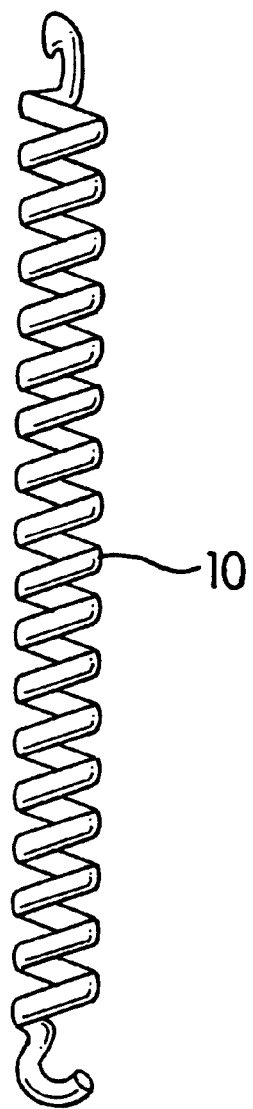
FIG. 1a
FIG. 1b

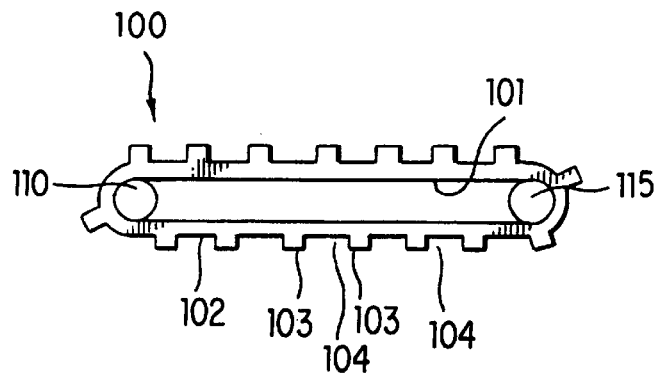
FIG.5
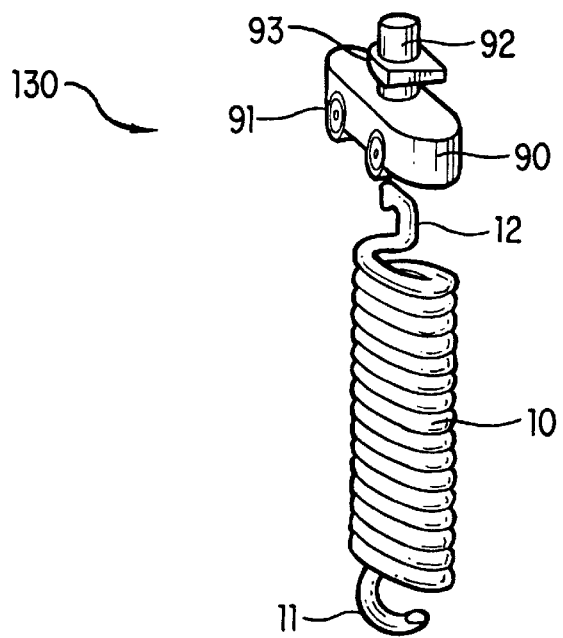
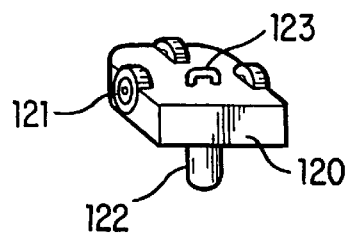
FIG.6

SHAPE MEMORY ALLOY ACTUATORS FOR AIRCRAFT LANDING GEAR

RELATED APPLICATIONS

This is a Continuation of U.S. patent application Ser. No. 09/764,117, filed Jan. 19, 2001, now U.S. Pat. No. 6,367,253, which is a Continuation-In-Part of application Ser. No. 09/467,749, filed Dec. 20, 1999 and entitled "Heat Converter Engine Using A Shape Memory Alloy Actuator," now U.S. Pat. No. 6,226,992.

FIELD OF THE INVENTION

The present invention relates to mechanical actuators. More particularly, the present invention regards using a shape memory alloy as a power source in mechanical actuators for controlling aircraft landing gear.

BACKGROUND INFORMATION

A class of materials called shape memory alloys (SMA) exhibits a non-linear relationship between stress and strain when exposed to temperature changes. These alloys undergo a temperature related phase change that allows the SMA to return to any mechanical configuration imposed on the SMA when it is annealed. When the SMA is below its critical temperature, it becomes malleable and may be deformed into any arbitrary shape. Upon heating the SMA above the critical temperature, it undergoes a change in crystal structure and quickly resumes its stiff original shape. Cooling the SMA to below the critical temperature will, again, cause it to return it to the cold malleable condition allowing it to be deformed, but always returning to its original shape when it is heated above the critical temperature. The best known SMA is Nitinol, a titanium nickel alloy, having 53.5–56.5% nickel content by weight. With a temperature change of as little as 18° F., Nitinol can exert a force of as much as 60,000 psi when exerted against a resistance to changing its shape.

Several prior art patents have disclosed the use of SMAs as actuators. For example, U.S. Pat. No. 4,932,210 to Julien et al. discloses the use of a shape memory alloy actuator for accurately pointing or aligning a moveable object. The SMA elements are arranged in a push-pull configuration so that one element in the activated state moves the object while another element on the opposite side in the soft state acts as a dynamic damper to prevent overtravel of the object. Similarly, U.S. Pat. No. 5,061,914 to Busch et al. discloses SMA actuators that are mechanically coupled to one or more movable elements such that the temperature induced deformation of the actuators exerts a force or generates motion of the mechanical element. However, these systems are used for precision type operations and produce little output power. These systems are not suitable for producing enough power to drive small pumps or motors, for example, a water pump in an automobile.

Several prior art patents also describe the use of SMAs to drive a shaft in a motor. For example, U.S. Pat. No. 4,665,334 to Jamieson discloses a rotary stepping device having a rotatable shaft which is driven by a coiled spring clutch. An actuator made of an SMA is heated and used to pull the spring clutch to tighten it and rotate the shaft. When the SMA is cooled it returns to its malleable state and releases the spring clutch which loosens from around the shaft and returns to its original position without rotating the shaft in the opposite direction. U.S. Pat. No. 4,027,479 to Cory discloses a heat engine with an endless belt which includes a number of high density elements secured to lengths of SMA wire. The belt is attached to a pulley connected to a shaft. Two portions of the belt are maintained at different temperatures and the belt is constrained to move the elements in a continuous path into a field attracting the elements at the hot portion and out of the field at the cold portion. The SMA wire in the cold portion is stretched and the SMA wire in the hot portion contracts resulting in higher element density on the portion entering the field and thus a net force drives the belt about the pulley. However, these systems are also limited in their energy output and their complicated construction makes them impractical for use in standard machinery such as an engine or motor.

SUMMARY OF THE INVENTION

Shape memory alloy actuators for aircraft landing gear are provided. In one embodiment a retractable aircraft landing gear system is provided. This embodiment includes a shape memory spring strut having a first end and a second end wherein the shape memory spring strut is extendable from a first length to a second length and the shape memory spring strut contains a shape memory alloy. This embodiment also includes a shape memory spring strut activation line connected to the shape memory spring strut wherein the shape memory spring strut activation line may be configured to activate the shape memory spring strut and a longitudinal connecting member having a first segment and a second segment wherein the first segment is in pivotal contact with the first end of the shape memory spring strut and the second segment supports a wheel rotatably mounted on a pin. The connecting member may be moveable along a line of travel from an extended position to a retracted position in this embodiment.

In a second embodiment a method of retracting aircraft landing gear is provided. This method comprises activating a shape memory alloy within a shape memory spring strut wherein the shape memory alloy is activated via a shape memory spring strut activation line in contact with the shape memory spring strut, the shape memory spring strut having a first end and a second end and being extendable from a first length to a second length.

BRIEF DESCRIPTION OF THE DRAWINGS

FIG. 1a shows a first view of an exemplary shape memory spring (SMS) according to the present invention.

FIG. 1b shows a first view of an exemplary shape memory spring (SMS) according to the present invention.

FIG. 5 shows a top view of an exemplary conveyor belt system for a heat converter engine according to the present invention.

FIG. 6 shows an exemplary SMS assembly for a heat converter engine according to the present invention.

DETAILED DESCRIPTION

Figure 2:
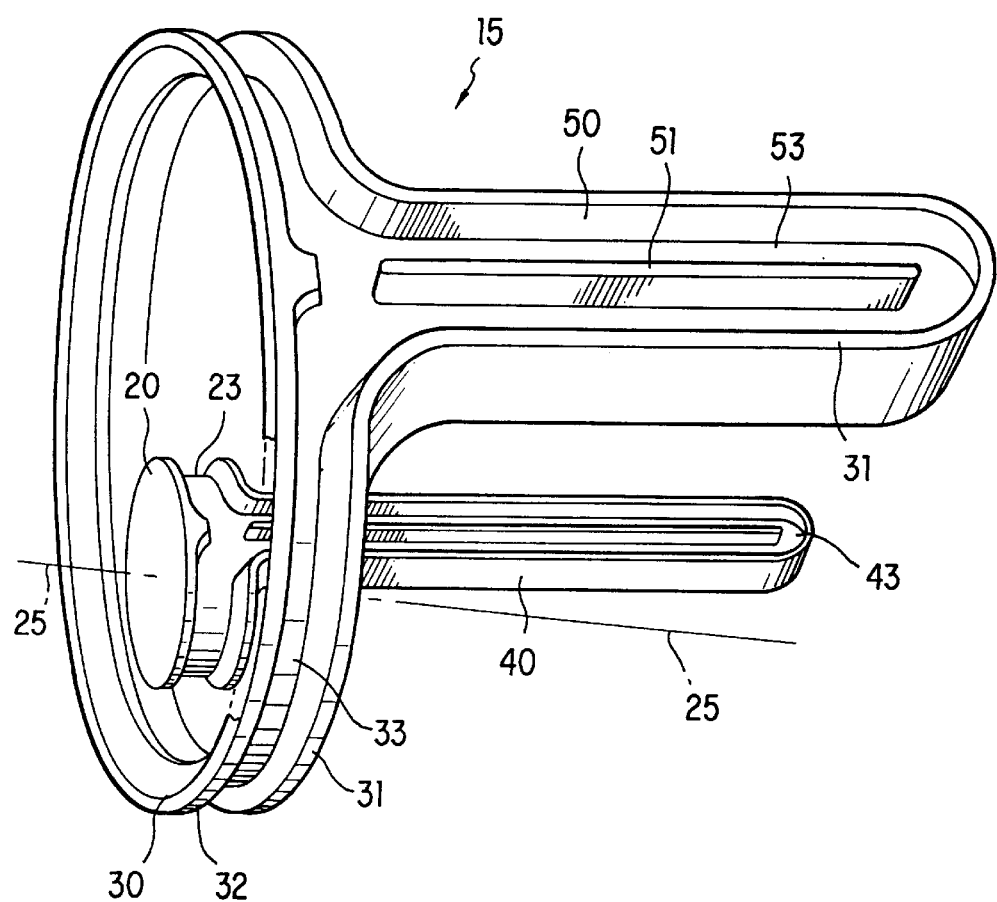
FIG. 2 shows a first view of an exemplary heat converter engine according to the present invention.

The present invention may be further understood with reference to the following description and the appended drawings, wherein like elements are provided with the same reference numerals. FIGS. 1a–b show a shape memory spring (SMS) 10 constructed of a shape memory alloy (SMA), for example, Nitinol. As described above, when an SMA is below its critical temperature, it becomes malleable and may be deformed into any shape. However, when the SMA is heated above its critical temperature the alloy undergoes a temperature related phase change allowing it to return to the mechanical configuration imposed on the material when it was annealed. FIG. 1a shows SMS 10 in its original compressed shape, i.e., above the SMAs critical temperature. Therefore, when the SMA of SMS 10 is heated above its critical temperature, SMS 10 returns to the compressed state as illustrated in FIG. 1a. FIG. 1b shows SMS 10 when the SMA is below its critical temperature. Because the SMA is malleable below its critical temperature, SMS 10 may be stretched, increasing its length. The purpose of this particular deformation will be described in greater detail below. Those skilled in the art will understand that this deformation is only exemplary and that it is also possible to anneal SMS 10 so that the stretched state is the original state and SMS 10 may be compressed when the SMA is malleable.

FIG. 2 shows inner crank shaft carrier 20, outer crank shaft carrier 30, inner derail 40 and outer derail 50 according to a first embodiment of heat converter engine 15 of the present invention. Outer crank shaft carrier 30 is substantially cylindrical having raised walls 31 and 32 which form channel 33 around the circular perimeter of outer crank shaft carrier 30. Outer derail 50 is integrally connected to outer crank shaft carrier 30 such that raised wall 31 continues around the outside perimeter of outer derail 50. Outer derail 50 also has raised wall 51, which, along with raised wall 31 forms channel 53 in outer derail 50. Channel 33 of outer crank shaft carrier 30 and channel 53 of outer derail 50 form a single continuous channel through outer crank shaft carrier 30 and outer derail 50. The purpose of this continuous channel will be described in greater detail below. Inner crank shaft carrier 20 is substantially similar in shape to outer crank shaft carrier 30, including having channel 23. Inner crank shaft carrier 20 is smaller and fits inside the hollow center of outer crank shaft carrier 30. Inner derail 40 is substantially similar in shape to outer derail 50, including having channel 43. When inner crank shaft carrier 20 is placed inside outer crank shaft carrier 30 the inner derail 40 and outer derail 50 should be aligned so that channel 43 is substantially parallel to channel 53. Those skilled in the art will understand that the arrangement of heat converter engine 15 shown in FIG. 2 is only exemplary and that there are other arrangements for the elements shown in this figure. For example, channel 43 of inner derail 40 may be arranged so that it faces inward towards axis 25 of inner crank shaft carrier 20 and opposes channel 53 of outer derail 50. In this arrangement, channel 23 may be formed on the inside surface of the outer perimeter of inner crank shaft carrier 20 so that channel 23 and channel 43 form a continuous channel.

Figure 3:
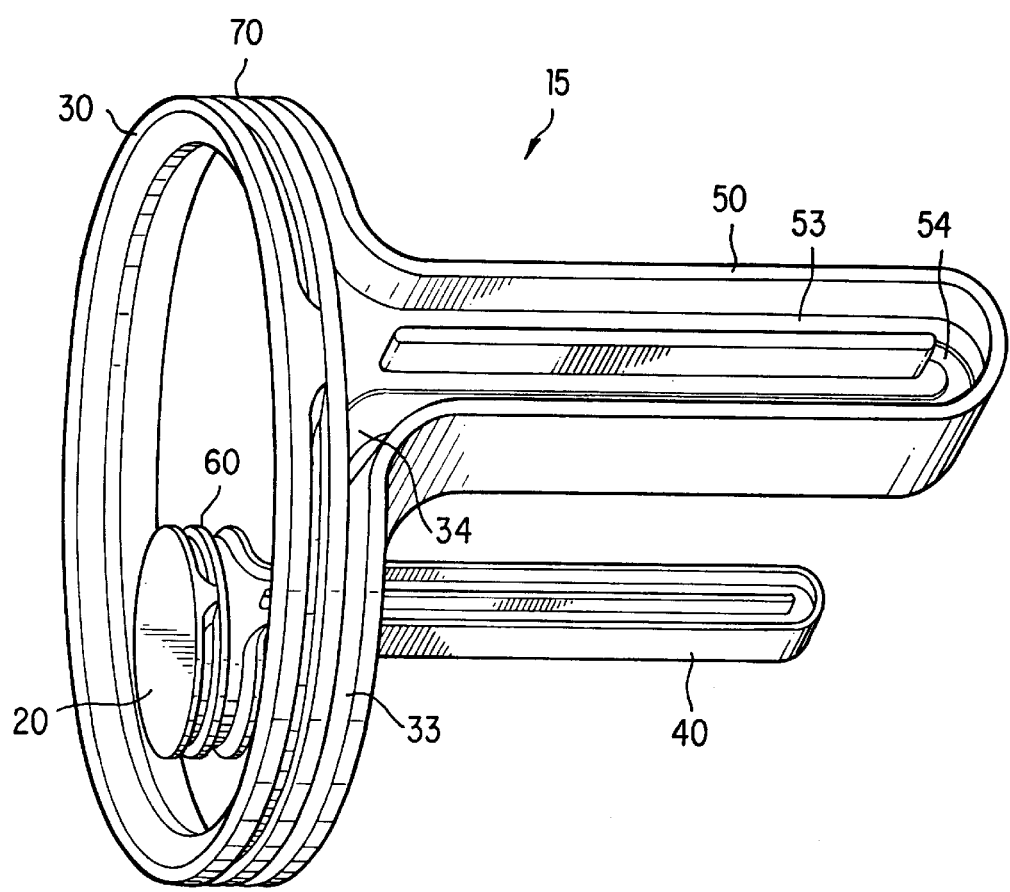
FIG. 3 shows a second view of an exemplary heat converter engine according to the present invention.

FIG. 3 shows inner crank shaft 60 located on inner crank shaft carrier 20 and outer crank shaft 70 located on outer crank shaft carrier 30 added to heat converter engine 15. Inner crank shaft 60 and outer crank shaft 70 are mounted on their respective crank shaft carriers 20 and 30 so they may rotate freely. Those skilled in the art will understand that there are numerous manners of mounting crank shafts 60 and 70 to crank shaft carriers 20 and 30. FIG. 3 also shows another feature of interest in outer crank shaft carrier 30 and outer derail 50. Slit 34 runs along the entire length of channel 33 in outer crank shaft carrier 30 and slit 54 runs along the entire length of channel 53 in outer derail 50. The purpose of slits 34 and 54 will be described in greater detail below.

Figure 4:
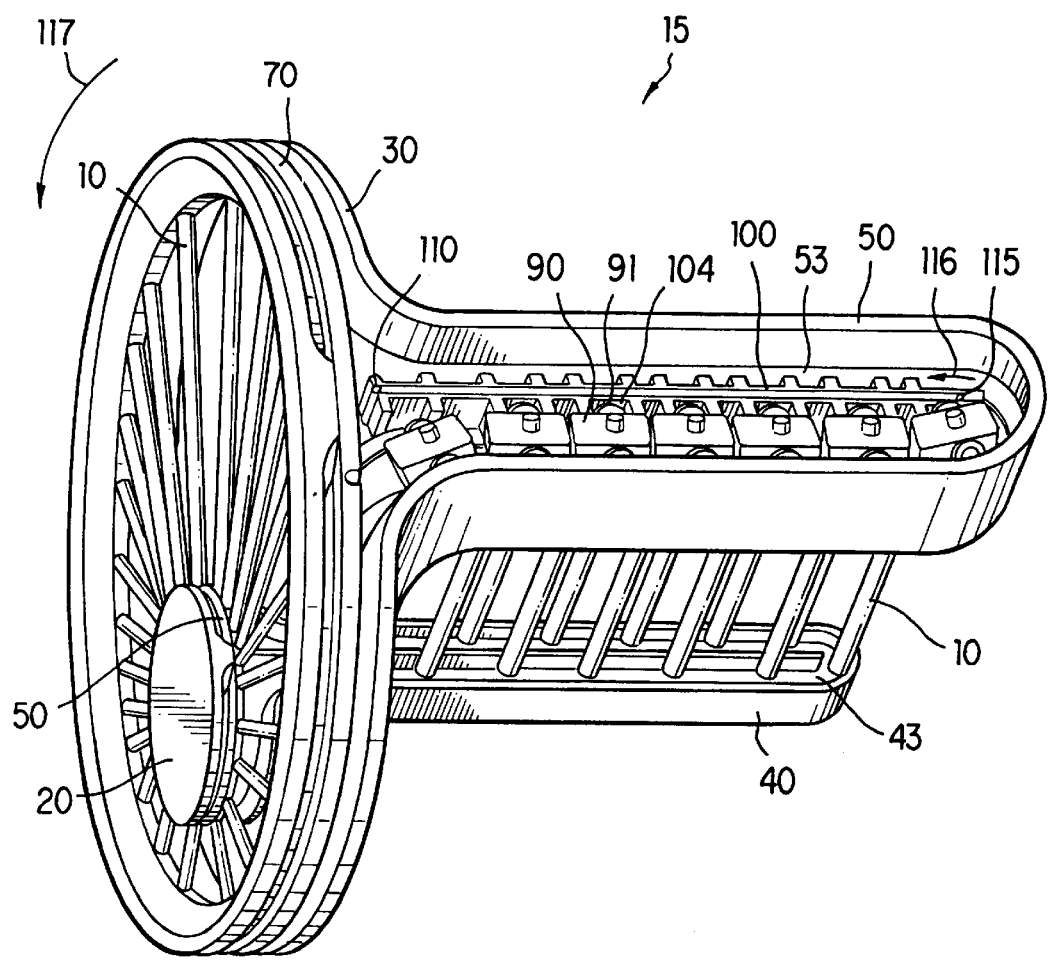
FIG. 4 shows a third view of an exemplary heat converter engine according to the present invention.

FIG. 4 shows additional components added to heat converter engine 15, including SMS 10 (shown in sketch form as bars), outer SMS carriers 90 and conveyor belt 100 which is coupled to conveyor belt gears 110 and 115. The number of outer SMS carriers 90 shown in FIG. 4 is only exemplary and it should be understood that there is an outer SMS carrier 90 corresponding to each SMS 10 in heat converter engine 15. Conveyor belt 100 is driven by conveyor belt gear 110 in the direction of arrow 116 and continuously loops around conveyor belt gears 110 and 115. The mechanism to drive conveyor belt gear 110 will be described in greater detail below. FIG. 5 shows a top view of conveyor belt 100 which has flat inner surface 101 that comes in contact with conveyor belt gears 110 and 115 and ribbed outer surface 102. Ribs 103 form pockets 104 on ribbed outer surface 102. Referring back to FIG. 4, wheels 91 of outer SMS carriers 90 engage in pockets 104 of conveyor 100 as SMS carriers enter outer derail 50, thereby coupling outer SMS carriers 90 to conveyor belt 100. The coupling of outer SMS carriers 90 to conveyor belt 100 also causes outer SMS carriers 90 to move through channel 53 of outer derail 50 in the direction of arrow 116. Those skilled in the art will understand that SMS carriers 90 may be coupled in other manners to conveyor 100 in such a way that the rotation of conveyor 100 is imparted to SMS carriers 90. Those skilled in the art will also understand that there is a corresponding conveyor belt and inner SMS carriers (not shown) that move in the same direction through channel 43 of inner derail 40.

FIG. 6 shows a detail view of SMS 10, outer SMS carrier 90 and inner SMS carrier 120. Inner SMS carrier 120 has wheels 121, pin guide 122 and hook 123. Similarly outer SMS carrier 90 has wheels 91, pin guide 92, wedge guide 93 and a hook (not shown). First end 11 of SMS 10 is connected to hook 123 of inner SMS carrier 120 and second end 12 of SMS 10 is connected to a hook (not shown) of outer SMS carrier 90 creating SMS assembly 130. As described with reference to FIG. 3, outer crank shaft carrier 30 and outer derail 50 may have slits 34 and 54, respectively. The purpose of slits 34 and 54 is that as outer SMS carrier 90 of SMS assembly 130 moves through channels 33 and 53, SMS 10 of SMS assembly 130 may project through slits 34 and 54. Similarly, channels 23 and 43 may also have slits for the projection of SMS 10, if channels 23 and 43 are arranged to oppose channels 33 and 53. Throughout the figures outer and inner SMS carriers 90 and 120 are shown with varying numbers of wheels. Those skilled in the art will understand that the number of wheels is not important and the purpose of the wheels is to allow the carriers to move freely through the channels.

Figure 7:
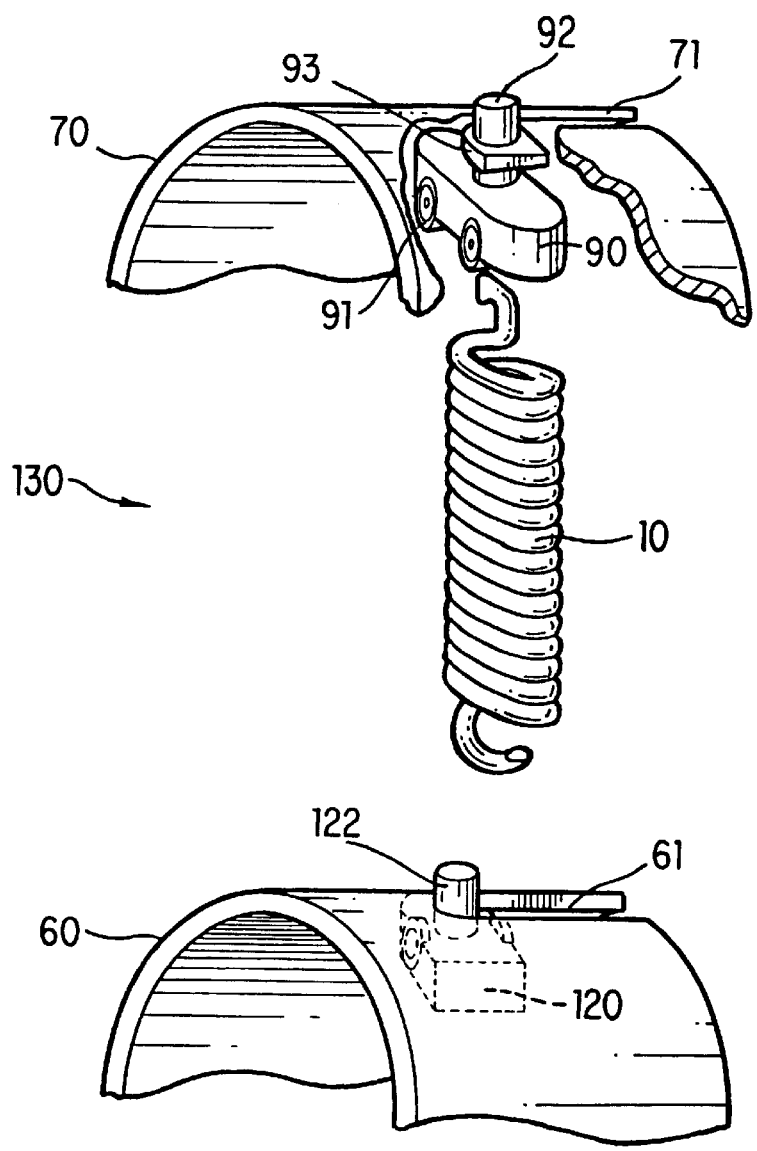
FIG. 7 shows a detail view of an exemplary SMS assembly coupled to exemplary crank shafts in a heat converter engine according to the present invention.

FIG. 7 shows an exemplary manner of coupling SMS assembly 130 to inner crank shaft 60 and outer crank shaft 70. Inner crank shaft 60 has slot 61 which engages pin guide 122 of inner SMS carrier 120. Similarly, outer crank shaft 70 has slot 71 which engages pin guide 92 of outer SMS carrier 90. The purpose of wedge guide 93 will be described in greater detail below. When inner SMS carrier 120 is engaged with inner crank shaft 60 and outer SMS carrier 90 is engaged with outer crank shaft 70, SMS assembly 130 is coupled to crank shafts 60 and 70. Thus, as crank shafts 60 and 70 rotate about their respective carriers 20 and 30, SMS assembly 130 also rotates. As will be described in greater detail below, the action of the SMS assemblies causes the crank shafts to rotate. Those skilled in the art will understand that there are numerous manners of coupling SMS assembly 130 to crank shafts 60 and 70 and the above described manner is only exemplary. It should also be understood that crank shafts 60 and 70 may have numerous slots 61 and 71 located around the entire circumference of each crank shaft so that any number of SMS assemblies 130 may be engaged at any particular time. Also, in FIG. 7, pin guide 122 is shown on the top of inner SMS carrier 120, whereas in FIG. 6, pin guide 122 is shown on the bottom of inner SMS carrier 120. As described above, there are numerous possible arrangements for the elements of heat converter engine 15 and whether inner SMS carrier 120 is located inside or outside inner crank shaft 60 determines the location of guide 122.

Figure 8:
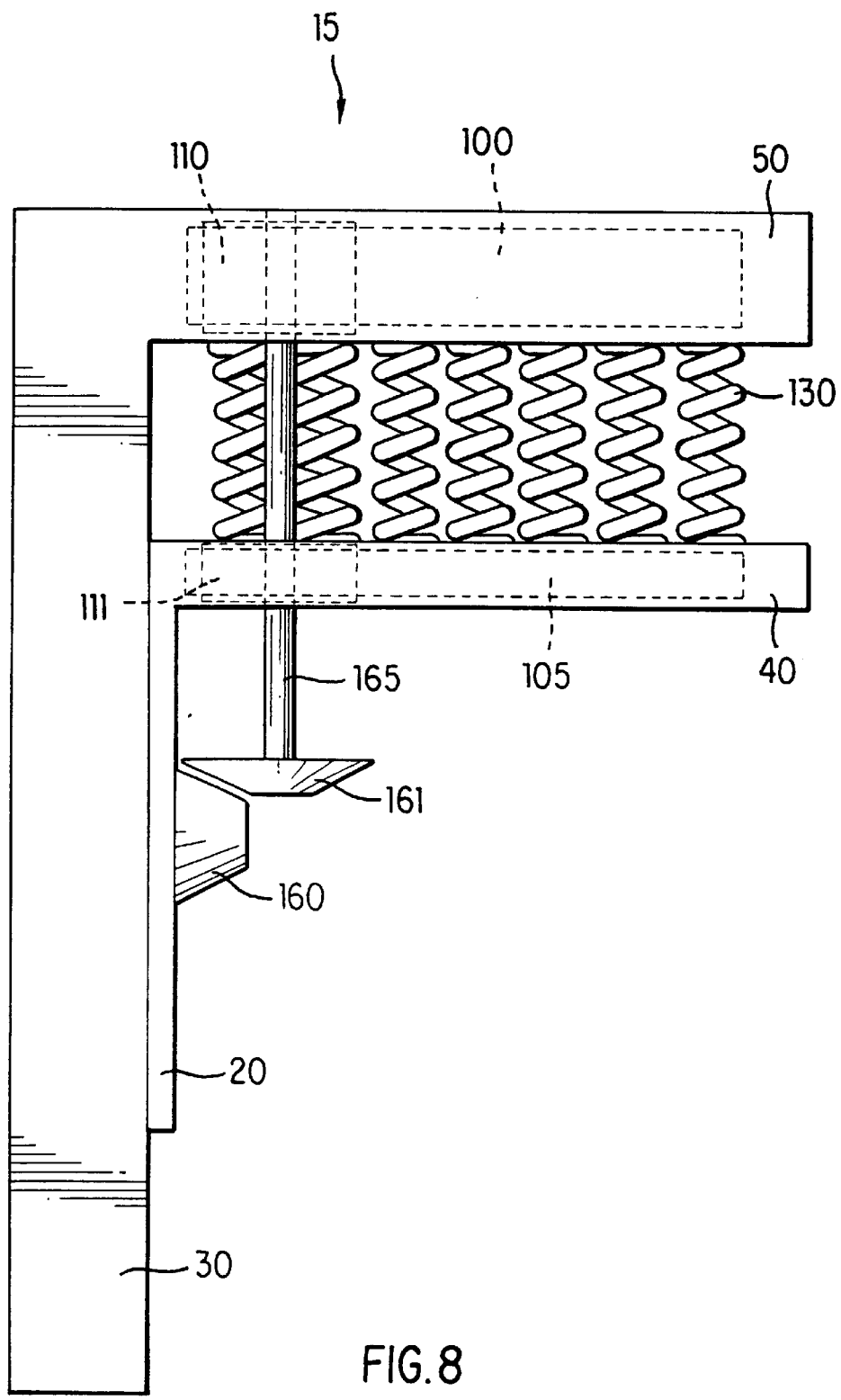
FIG. 8 shows an exemplary system for powering a conveyor system in a heat converter engine according to the present invention.

FIG. 8 shows a cross-section of heat converter engine 15 showing a side view of inner crank shaft carrier 20, outer crank shaft carrier 30 and the derailing area. This figure shows an exemplary arrangement for driving outer conveyor belt 100 located in outer derail 50 and inner conveyor belt 105 located in inner derail 40. Gear 160 is coupled to inner crank shaft 60 (not shown) in any number of known manners, for example, a rotor may be attached to inner crank shaft 60 to impart rotational movement to gear 160. The coupling of gear 160 to gear 161 imparts the rotation of inner crank shaft 60 to shaft 165 connected to gear 161. The rotation of shaft 165 is imparted to conveyor belts 100 and 105 through conveyor belt gears 110 and 111 which are coupled to shaft 165. Those skilled in the art will understand that gears 160 and 161 may be selected to control the speed that SMS assemblies 130 move through the inner and outer derails 40 and 50 relative to the rotational speed of inner crank shaft 60. The speed that SMS assemblies 130 move through inner and outer derails 40 and 50 may be determined by numerous factors including the alloy used for the SMS assembly, the cooling rate of the cooling medium, the length of the derail area, etc.

Figure 9:
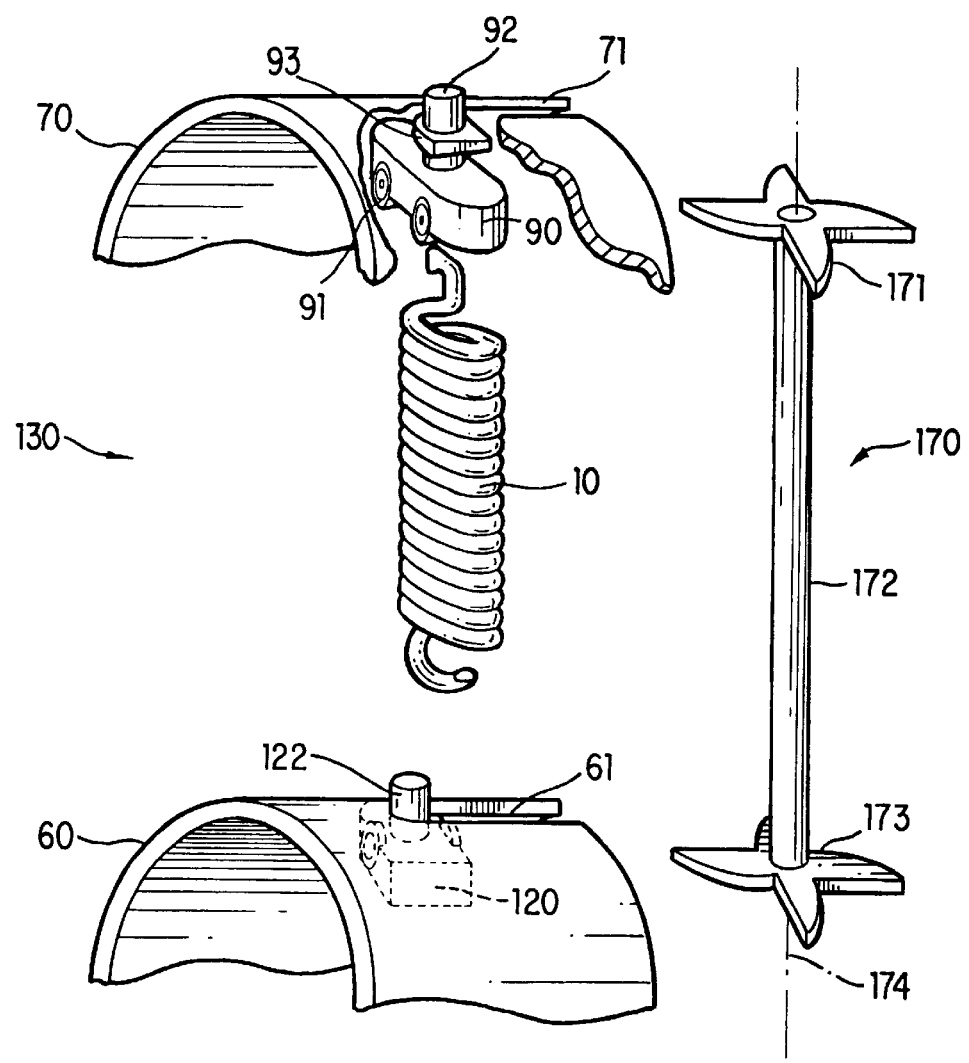
FIG. 9 shows an exemplary system for derailing an SMS assembly coupled to crank shafts in a heat converter engine according to the present invention.

FIG. 9 shows an exemplary manner of derailing SMS assembly 130 from inner crank shaft 60 and outer crank shaft 70. Derailer 170 includes shaft 172 connected to outer derailing wheel 171 and inner derailing wheel 173. In FIG. 9, derailer 170 is shown offset from inner and outer crank shafts 60 and 70 for illustration purposes. In operation, derailer 170 is within the boundaries of inner and outer crank shafts 60 and 70 so that outer and inner derailing wheels 171 and 173 may engage pin guides 92 and 122 of outer and inner SMS carriers 90 and 120, respectively. The operation of derailer 170 will be described in reference to the derailment of outer SMS carrier 90, however, it should be understood that the operation is similar for the derailment of inner SMS carrier 120. Derailer 170 rotates about vertical axis 174 as the portion of inner and outer crank shafts 60 and 70 coupled to SMS assembly 130 move towards derailer 170. Pin guide 92 of outer SMS carrier 90 comes into contact with outer derailing wheel 171 of derailer 170. The rotation of derailer 170 pushes pin guide 92 out of slot 71 of outer crank shaft 70 causing SMS assembly 130 to become decoupled from outer crank shaft 70. Those skilled in the art will understand that the shape of outer and inner derailing wheels 171 and 173 and the direction of rotation of derailer 170 is not important. The purpose of derailer 170 is to engage outer and inner SMS carriers 90 and 120 and decouple them from inner and outer crank shafts 60 and 70. Any known mechanical or electrical means may be used to control the rotation of derailer 170. The conveyor system and derailing operations described above may be timed with the rotation of the inner and outer crank shafts 60 and 70 (the heat converter engines RPM).

Figure 10:
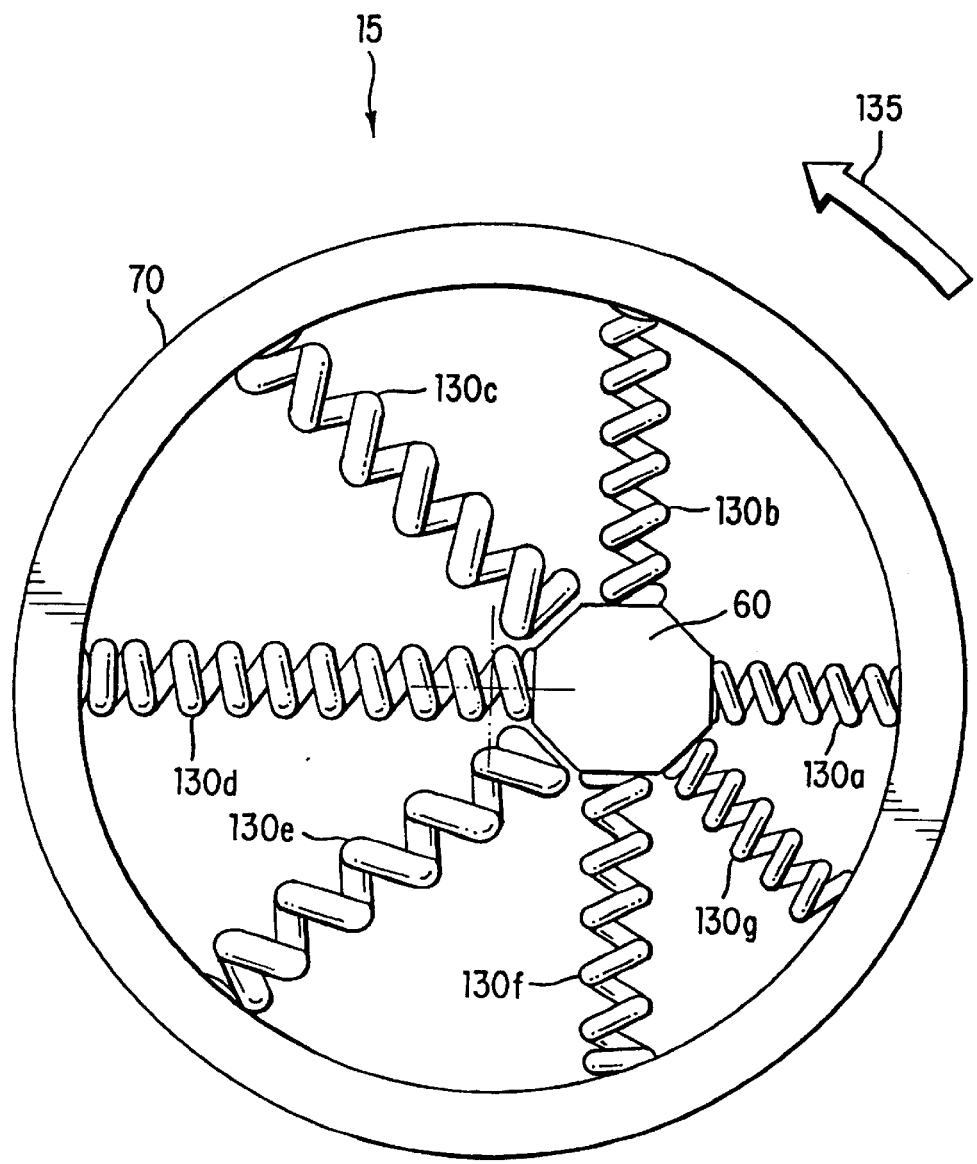
FIG. 10 shows a front view of a heat converter engine according to the present invention.

An exemplary manner of operating heat converter engine 15 will be described in more detail with reference to FIGS. 4 and 10. FIG. 10 shows a front view cross-section of heat converter engine 15 showing SMS assemblies 130*a–g*, inner crank shaft 60 and outer crank shaft 70. The rotation of crank shafts 60 and 70 coupled to SMS assemblies 130*a–g* will be described in more detail with reference to an exemplary SMS assembly. The exemplary SMS assembly may be considered to start at the position of SMS assembly 130*a*, where it has been previously heated above the critical temperature of the SMA and is in its original compressed state. Inner derail 40 and outer derail 50 (not shown) are located between the position of SMS assemblies 130*a* and 130*b*. Thus, as described above, the exemplary SMS assembly may be decoupled or derailed from inner crank shaft 60 and outer crank shaft 70 into inner derail 40 and outer derail 50 between the positions of SMS assemblies 130*a* and 130*b*. As the exemplary SMS assembly travels through the inner and outer derails 40 and 50, the exemplary SMS assembly is cooled below its critical temperature and becomes malleable, allowing the SMS to be stretched. The cooled exemplary SMS assembly leaves the inner and outer derails 40 and 50 and re-couples with crank shafts 60 and 70 in the position of SMS assembly 130*b*. As shown in FIG. 10, the exemplary SMS assembly in the position of SMS assembly 130*b* has become stretched with respect to the original length of the SMS shown in the position of SMS assembly 130*a*. As crank shafts 60 and 70 continue to rotate in the direction of arrow 135, the exemplary SMS assembly rotates through the positions of SMS assemblies 130*c* and 130*d* where the SMS becomes progressively longer or more stretched because it remains in its malleable state. At a predefined position of the rotation, a heating medium will begin to heat the SMS of the exemplary SMS assembly. The predetermined position for application of the heating medium may be determined by a variety of factors including the alloy used for the SMS, the heat transfer rate of the heating medium, the speed of rotation, etc. As crank shafts 60 and 70 continue to rotate in the direction of arrow 135, the exemplary SMS assembly is heated above its critical temperature and begins to regain its original shape. The beginning of compression is when the exemplary SMS assembly is in the position of SMS assembly 130*e*. The action of the SMS assembly resuming its original shape causes a force to be exerted in the radial direction, which, in turn, causes inner crank shaft 60 and outer crank shaft 70 to rotate. Finally, as crank shafts 60 and 70 continue to rotate, the exemplary SMS assembly continues to resume its original shape as it is rotated through the positions of SMS assemblies 130*f* and 130*g* until it fully regains its original compressed state in the position of SMS assembly 130*a*. Thus, rotation of crank shafts 60 and 70 is accomplished by continuous heating and cooling of the SMS assemblies, where the force of the SMS assemblies returning to their original shape causes the crank shafts to rotate. Because each of the SMS assemblies 130*a–g* are in various states of compression, inner crank shaft 60 will not be concentric with outer crank shaft 70. However, those skilled in the art will recognize that inner crank shaft 60, while not centered within outer crank shaft 70, will remain at a fixed position relative to outer crank shaft 70.

Referring back to FIG. 4, a more detailed description of the travel of the exemplary SMS assembly through the derail area will be provided. As described above, the exemplary SMS assembly may be decoupled from the inner and outer crank shafts 60 and 70 by the derailer (not shown) when the exemplary SMS assembly has been heated and regained its original compressed shape. As the exemplary SMS assembly enters the derail area, outer SMS carrier 90 may be coupled to conveyor belt 100 and inner SMS carrier (not shown) may be coupled to the conveyor belt in inner derail 40. Also as described above, the conveyor belts rotate in the direction of arrow 115 and the exemplary SMS assembly rotates through channels 43 and 53 when it is coupled to the conveyor belts. A cooling medium is applied to the exemplary SMS assembly as it travels through the derail area to cool the SMA alloy below the critical temperature so SMS 10 becomes malleable. Those skilled in the art will understand that the exemplary SMS assembly may begin to stretch as it travels through the derail area because the distance between crank shafts 60 and 70 at the location where the exemplary SMS assembly is re-coupled to crank shafts 60 and 70 is greater than the location where the exemplary SMS assembly is decoupled from crank shafts 60 and 70. The decoupling of the heated SMS assemblies from crank shafts 60 and 70 to be cooled in the derail area eliminates resistance against the SMS assemblies that are being heated and compressing as described above with reference to FIG. 10. The elimination of this resistance results in a more powerful and efficient heat convertor engine.

Figure 11:
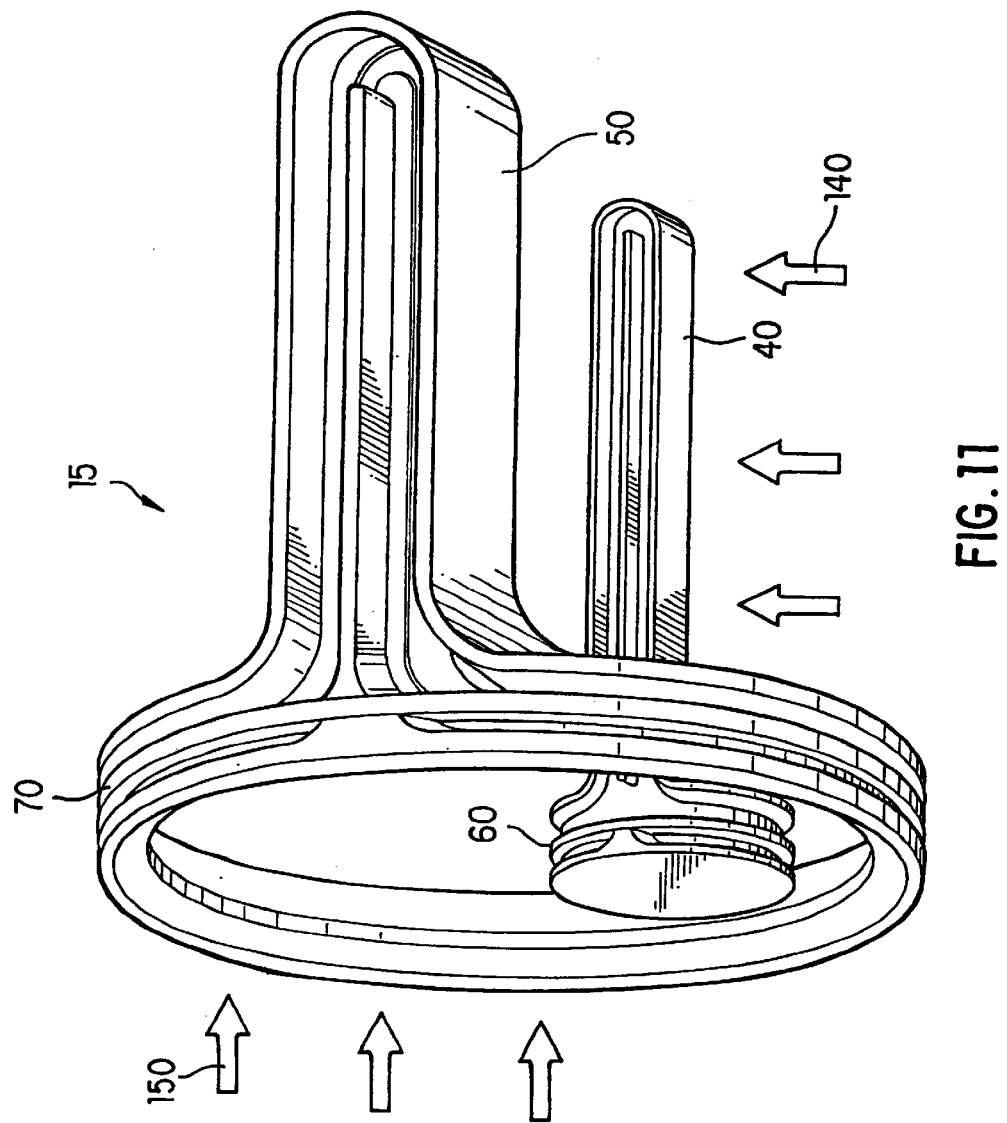
FIG. 11 shows an exemplary manner of applying a heating and cooling medium to a heat converter engine according to the present invention.

FIG. 11 shows the relative positions of the application of the heating and cooling mediums to heat converter engine 15. As described above, cooling medium 140 may be applied to the SMS assemblies (not shown) when they are located in the area of inner derail 40 and outer derail 50. Similarly, heating medium 150 may be applied to the SMS assemblies at a predetermined position when the SMS assemblies are coupled to crank shafts 60 and 70. Those skilled in the art will understand that any gas or liquid may be used to heat or cool the SMS assemblies, for example, air, water or a refrigerant may be used. Likewise, the heating or cooling medium may be contained in either an open system, where the heating or cooling medium is exhausted directly into the atmosphere, or in a closed system, where the heating or cooling medium may be recycled through the system. Also, the transfer of heat between the mediums and the SMS assemblies maybe direct or indirect, for example, through a heat exchanger.

Figure 12:
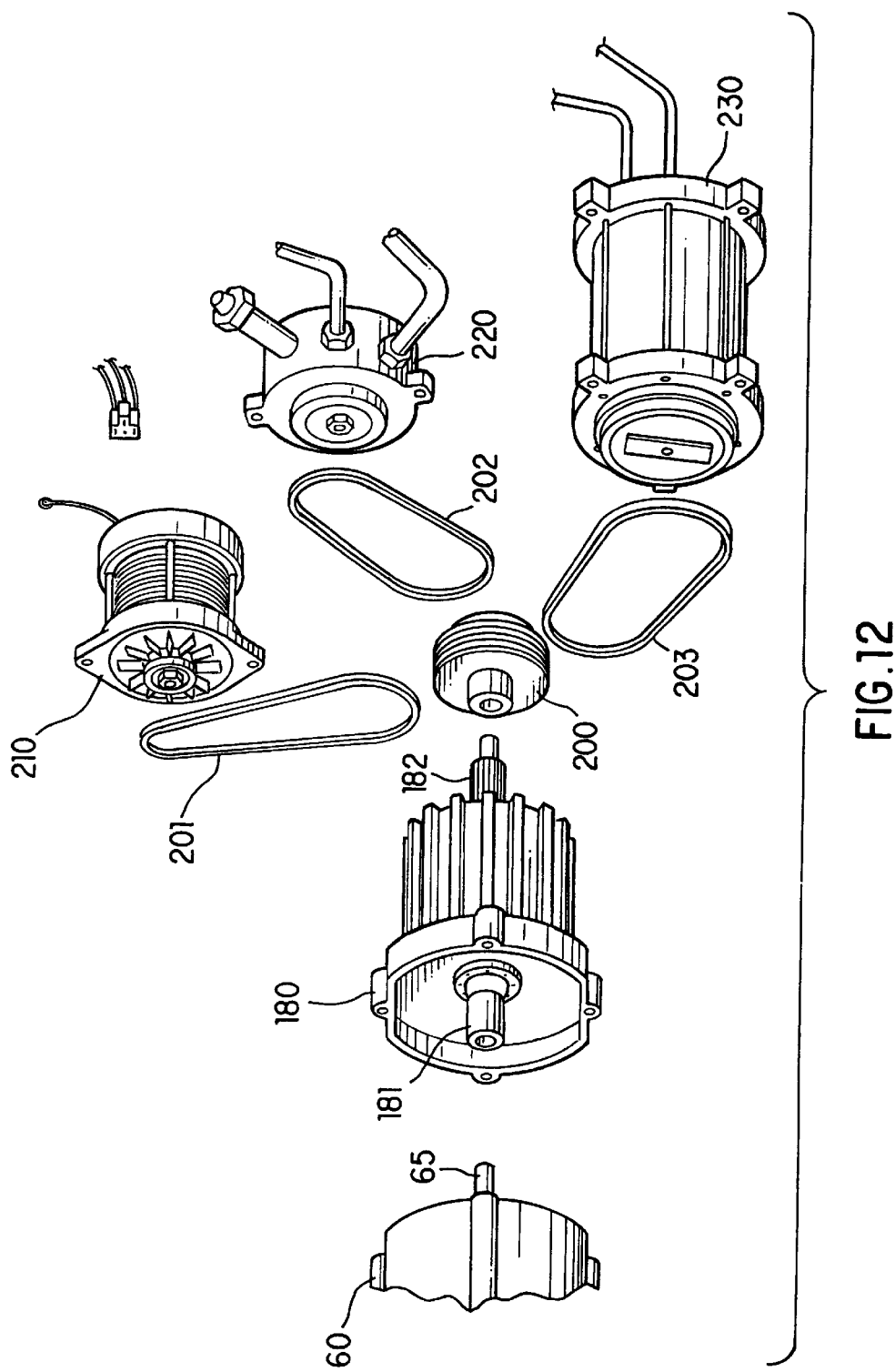
FIG. 12 shows an exemplary heat converter engine of the present invention as an alternative power source for mechanisms in an automobile.

FIG. 12 shows an exemplary use of a heat converter engine of the present invention as an alternative power source for mechanisms in an automobile. The use of a heat converter engine in on automobile may be advantageous because a heating medium (heated exhaust gas) and a cooling medium (air flow from the fan) are readily available. For example, inner crank shaft 60 may be coupled to drive shaft 65 which, in turn, is coupled to shaft 181 of transmission 180. Rotor 182 of transmission 180 may be coupled to pulley mechanism 200 which is connected to a series of drive belts 201–203. First drive belt 201 may be coupled to alternator 210, second drive belt 202 may be coupled to power steering pump 220, and third drive belt 203 may be coupled to air conditioning unit 230. As described above with reference to FIGS. 4 and 10, by heating and cooling SMS assemblies 130 of heat converter engine 15, it is possible to cause drive shaft 65, shaft space 181 and rotor 182 to rotate. The rotation of rotor 182 may cause pulley 200 to rotate and this rotation may be imparted to each of alternator 210, power steering pump 220 and air conditioning unit 230 by drive belts 201–203, respectively. Thus, the heat converter engine may be used as an alternative power source for these devices, resulting in lowering the load on the internal combustion engine of the automobile and causing an increase in efficiency. Other examples of devices in an automobile that may be powered by this alternative power source may be water pumps, fuel pumps, etc. Those skilled in the art will understand that the pulley and drive belt system described is only exemplary, and that depending upon the application, a differential or other similar gearing may be used to impart the correct amount of power to the device using the alternative power source. Additionally, this alternative power source is not limited to automobile or motor vehicle applications, it may be used in any situation where a device may be powered by imparting mechanical rotation to the end device, or it may be used to power a generator which may produce electrical power for any consumption device. Other examples of situations where heating and cooling mediums exist are natural hot springs or power plants where cooling water is used to cool the plants components.

Figure 13:
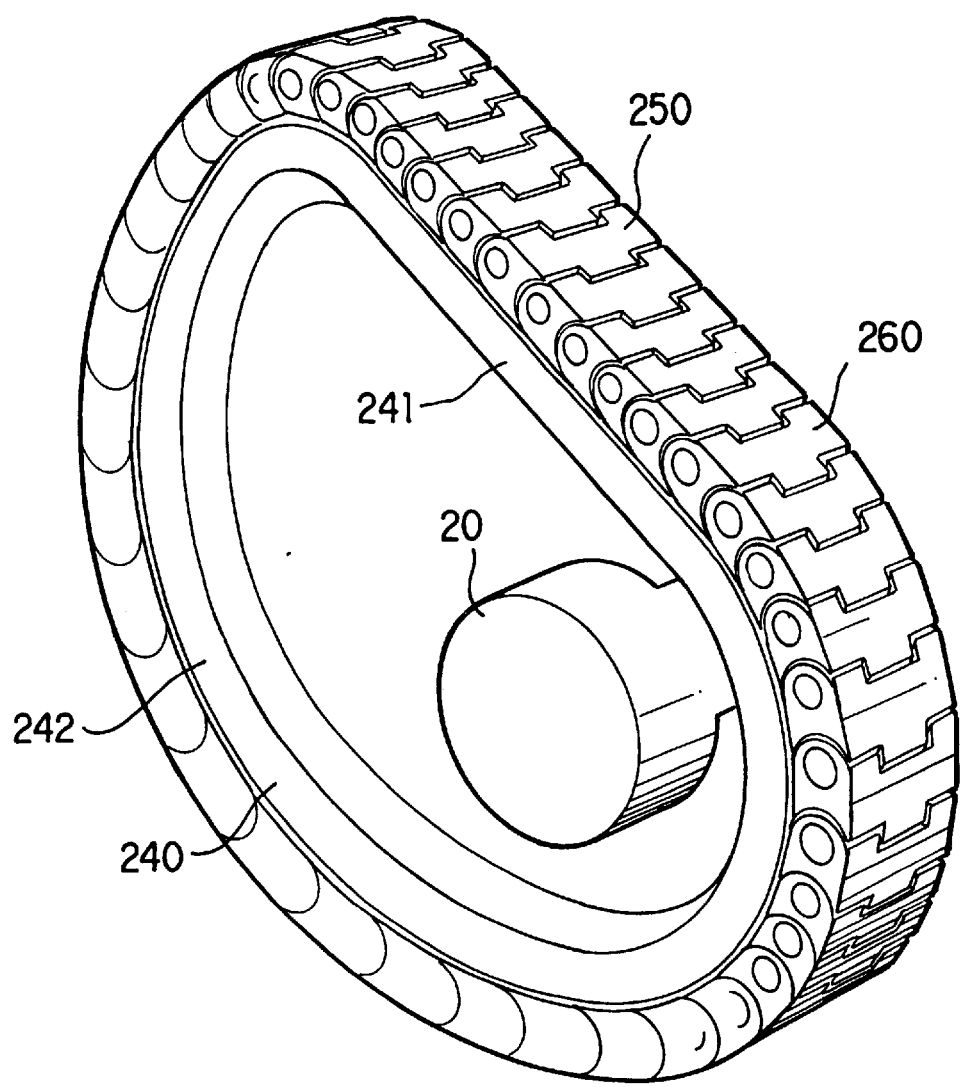
FIG. 13 shows an alternative embodiment of a crank shaft for a heat converter engine according to the present invention.
Figure 14A:
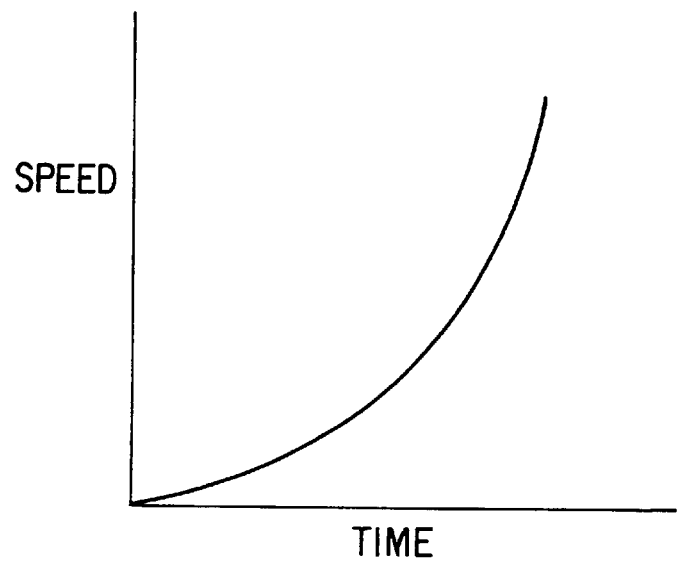
FIG. 14a shows a time versus speed curve for an exemplary heat converter engine having a substantially circular crank shaft according to the present invention.
Figure 14B:
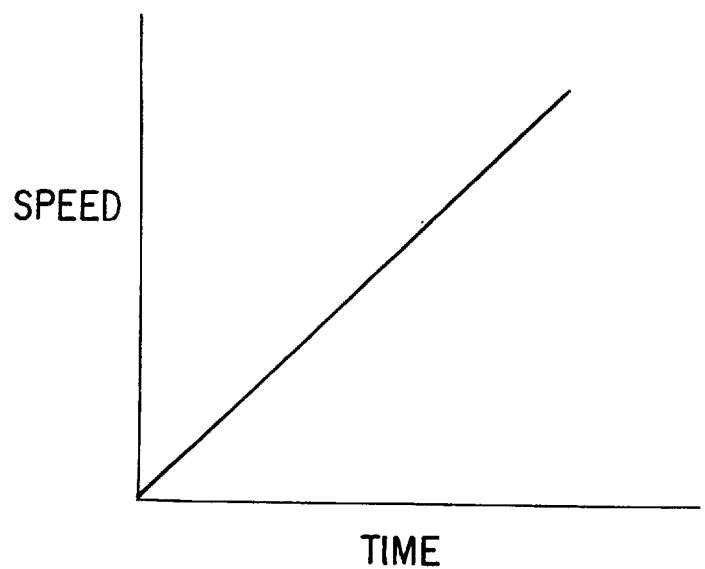
FIG. 14b shows a time versus speed curve for an exemplary heat converter engine having an alternatively shaped crank shaft according to the present invention.
Figure 17:
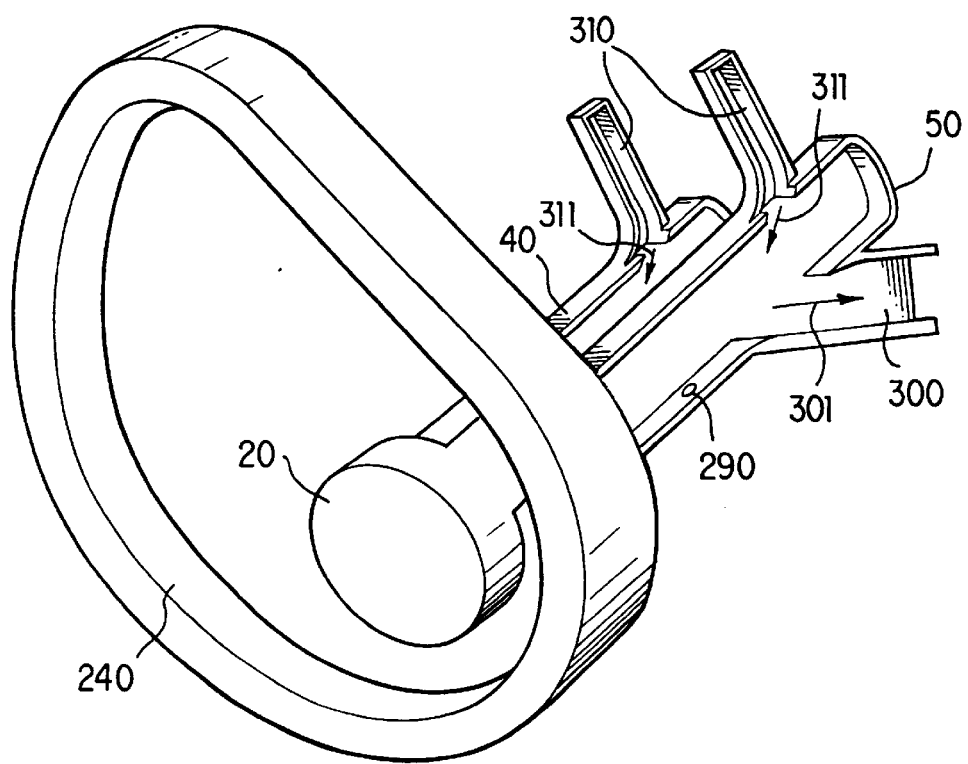
FIG. 17 shows an alternative embodiment of a heat converter engine according to the present invention.

FIG. 13 shows an alternative embodiment for outer crank shaft carrier 240 and outer crank shaft 250. In this embodiment, outer crank shaft carrier 240 has a substantially straight section 241 connected to an arc-shaped section 242, and outer crank shaft 250 is flexible to rotate about outer crank shaft carrier 240. Note that the derail portion of the heat converter engine is not shown in FIG. 13. FIG. 17 shows an example of a heat converter engine including outer crank shaft carrier 240 and the derail area. A plurality of links 260 are coupled to form flexible outer crank shaft 250. The remaining elements and operation of a heat converter engine having outer crank shaft carrier 240 and flexible outer crank shaft 250 are the same as those described above. The shape of outer crank shaft carrier 240 allows the flexible outer crank shaft 250 to rotate faster and have a more constant RPM. For example, FIG. 14a shows a time versus speed curve for a heat converter engine having a substantially circular outer crank shaft carrier and outer crank shaft as described with reference to FIG. 3. Whereas, FIG. 14b shows a time versus speed curve for a heat converter engine having the shape of outer crank shaft carrier 240 and flexible outer crank shaft 250. As shown by these curves, a heat converter engine with the outer crank shaft carrier shaped in the form of outer crank shaft carrier 240 produces higher speeds in a shorter amount of time and provides a more linear time versus speed characteristic. Those skilled in the art will understand that each of these designs may be more efficient for any number of applications and the particular type of crank shaft will be determined by the application.

Figure 15:
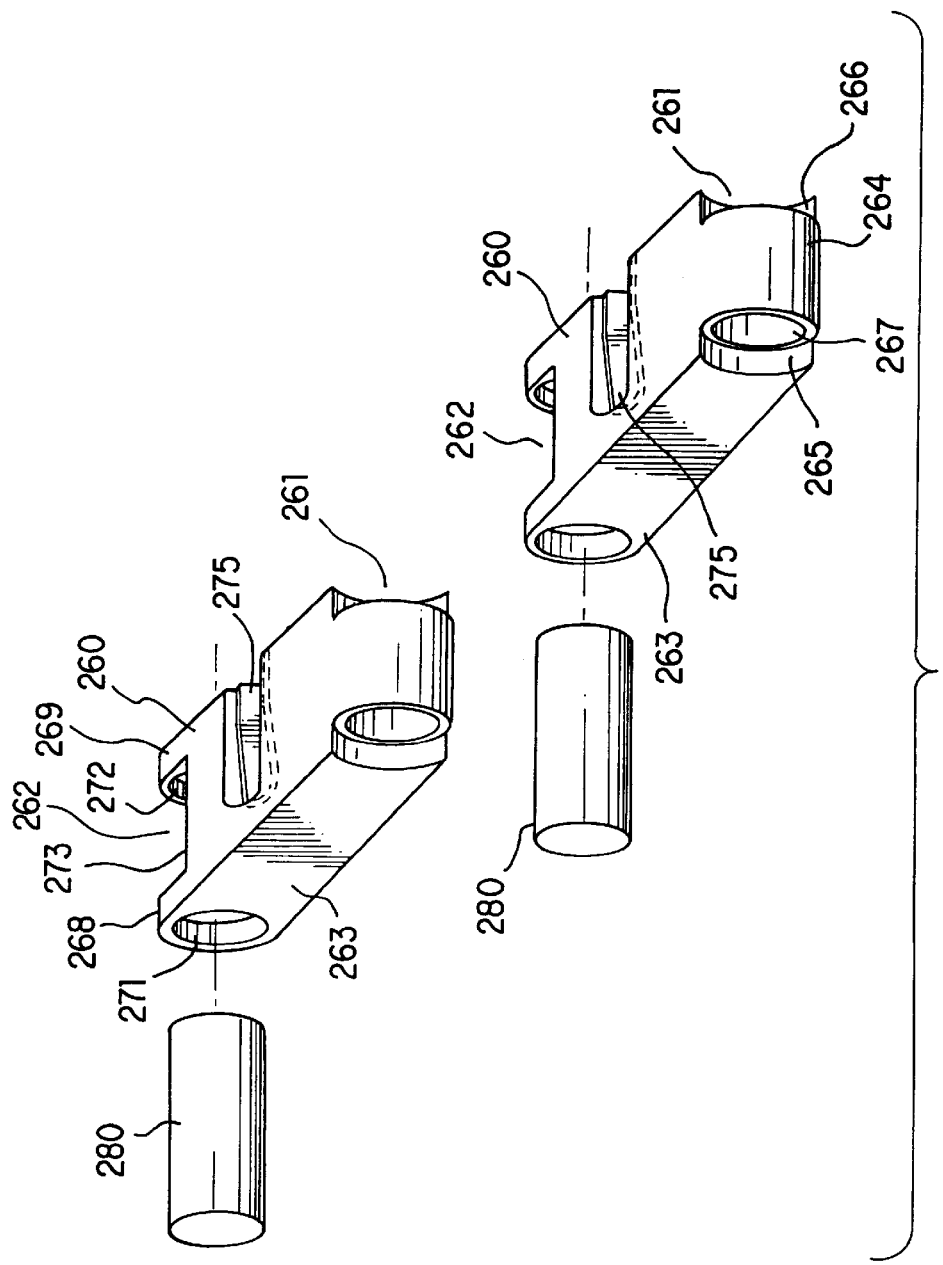
FIG. 15 shows an exemplary link of a flexible crank shaft for a heat converter engine according to the present invention.

FIG. 15 shows a detail view of exemplary links 260 of flexible outer crank shaft 250. Each link 260 has first end 261, second end 262 and middle section 263. First end 261 has a substantially cylindrical section 264 which has hollow center 267. Two arc-shaped surfaces 265 and 266 formed in middle section 263 are adjacent to cylindrical section 264 and have substantially the same curvature as cylindrical section 264. Second end 262 has two substantially cylindrical sections 268 and 269 which have hollow centers 268 and 269, respectively. Arc-shaped surface 273 formed in middle section 263 is between cylindrical sections 271 and 272 and has substantially the same curvature as cylindrical sections 271 and 272. Slot 275 is formed in middle section 263 and will be described in greater detail below. Links 260 may be coupled by inserting cylindrical section 264 of first end 261 into arc shaped surface 273 of second end 262. This insertion also causes cylindrical sections 268 and 269 of second end 262 to be inserted in arc shaped surfaces 265 and 266 of first end 261. The result of this insertion is that hollow centers 267, 271 and 272 of cylindrical sections 264, 268 and 269, respectively, form a continuous via through links 260 with a substantially uniform diameter. Connection pin 680 may be inserted into the via to couple links 260. A plurality of links 260 may be coupled to form flexible outer crank shaft 250.

Figure 16:
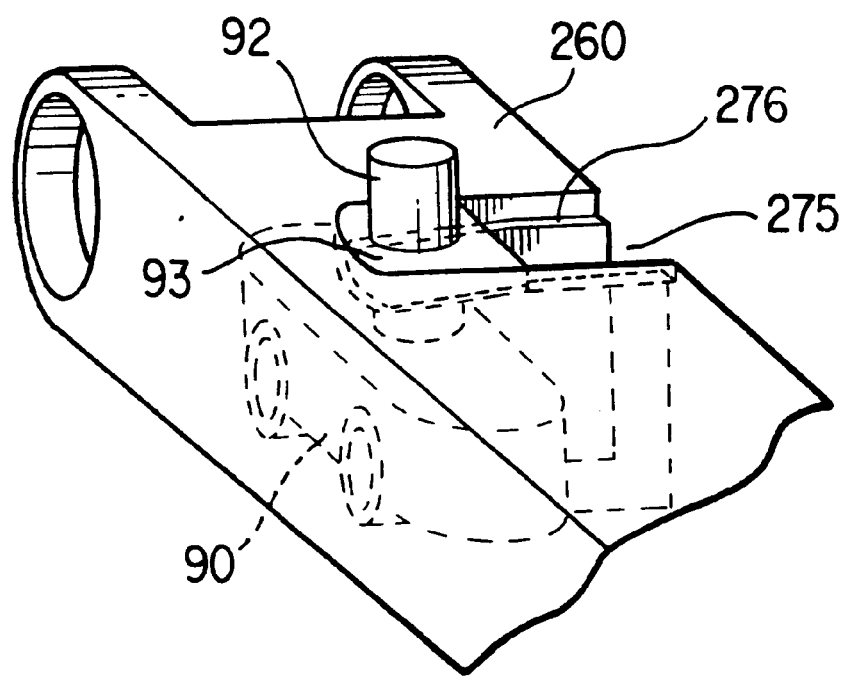
FIG. 16 shows an exemplary manner of coupling an exemplary SMS assembly to an exemplary link of a flexible crank shaft for a heat converter engine according to the present invention.

FIG. 16 shows a detail view of exemplary link 260 coupled to outer SMS carrier 90. Link 260 has slot 275 which is a cut out having two substantially straight sections connected by an arc shaped section running from the top to the bottom of link 260. At a predetermined distance from the top, the diameter of slot 275 is narrowed causing a ridge 276 to be formed in slot 275. Ridge 276 is closer to the top at the edge of slot 275 and tapers to be farther away from the top as it nears the arc section of slot 275. Outer SMS carrier 90 has pin guide 92 and wedge guide 93. Wedge guide 93 has substantially the same shape as slot 275 and is also tapered to widen in the arc section. As SMS carrier 90 is engaged in link 260, wedge guide 93 is seated on ridge 276 of slot 275 until the bottom of the arc section of wedge guide 93 comes into contact with the arc section of slot 275, coupling SMS carrier 90 to link 260. In this manner, SMS assemblies may be coupled to the outer crank shaft in heat converter engines having the shape described for outer crank shaft carrier 240 with reference to FIG. 13.

FIG. 17 shows an exemplary embodiment of a heat converter engine that has storage areas 300 and 310 for broken SMS assemblies and replacement SMS assemblies. The features of the exemplary heat converter engine are the same as described above, except that inner and outer derails 40 and 50 have additional storage areas 300 and 310. (Storage area 310 of inner derail 40 is not shown). Storage areas 300 and 310 form additional channels through which SMS assemblies may be moved. Sensor 290 senses whether an SMS assembly is in disrepair, for example, a broken SMS or carrier. Those skilled in the art will understand that there are numerous types of sensors that may be configured to detect a broken SMS or carrier, for example, a load sensor such as a spring loaded switch or a light beam sensor. When sensor 290 determines that an SMS assembly is in disrepair, it may send a signal to a derailer to derail the broken SMS assembly from outer and inner derail 40 and 50 into storage area 300 in the direction of arrow 301. Those skilled in the art will understand that a derailer similar to the one described above may be used for this purpose. New SMS assemblies may be stored in storage area 310, and when a broken SMS assembly is removed from outer and inner derail 40 and 50, a new SMS assembly from storage area 310 may move into the position voided by the broken spring. The new SMS assembly may move into outer and inner derail 40 and 50 in the direction of arrows 311. Those skilled in the art will understand that there are numerous methods of controlling the timing of moving the new SMS assembly into the position voided by the broken SMS assembly.

Figure 18:
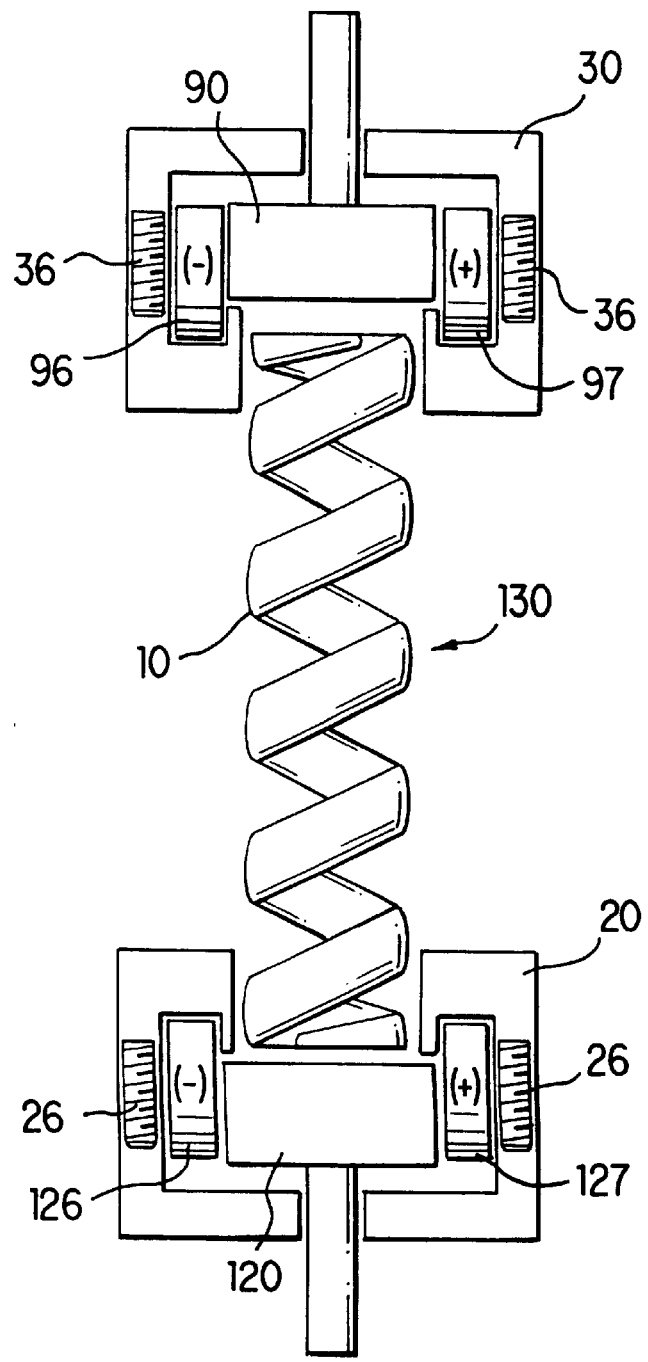
FIG. 18 shows an alternative embodiment wherein a heat converter engine according to the present invention may be used as an electric generator.

FIG. 18 shows an exemplary arrangement wherein a heat converter engine may operate as a generator or alternator. SMS assembly 130 is shown having SMS 10, outer SMS carrier 90 and inner SMS carrier 120. Outer SMS carrier 90 has wheels 96 and 97 which are constructed of a magnetic material, where wheel 96 has the opposite polarity of wheel 97. Similarly, inner SMS carrier 120 has wheels 126 and 127 constructed of a magnetic material, where wheel 126 has the opposite polarity of wheel 127. Inner crank shaft carrier 20 has coil 26 and outer crank shaft carrier 30 has coil 36. SMS assembly 130 travels through inner crank shaft carrier 20 and outer crank shaft carrier 30 which are both stationary. As the magnetic wheels of the outer and inner SMS carriers 90 and 120 pass through coils 26 and 36 of inner and outer crank shaft carriers 20 and 30, the movement induces a current to flow in coils 26 and 36. Thus, a heat converter engine rather than powering an automobiles alternator as described with respect to FIG. 12 may also serve as the alternator for an automobile.

Alternative Embodiments

Figure 19:
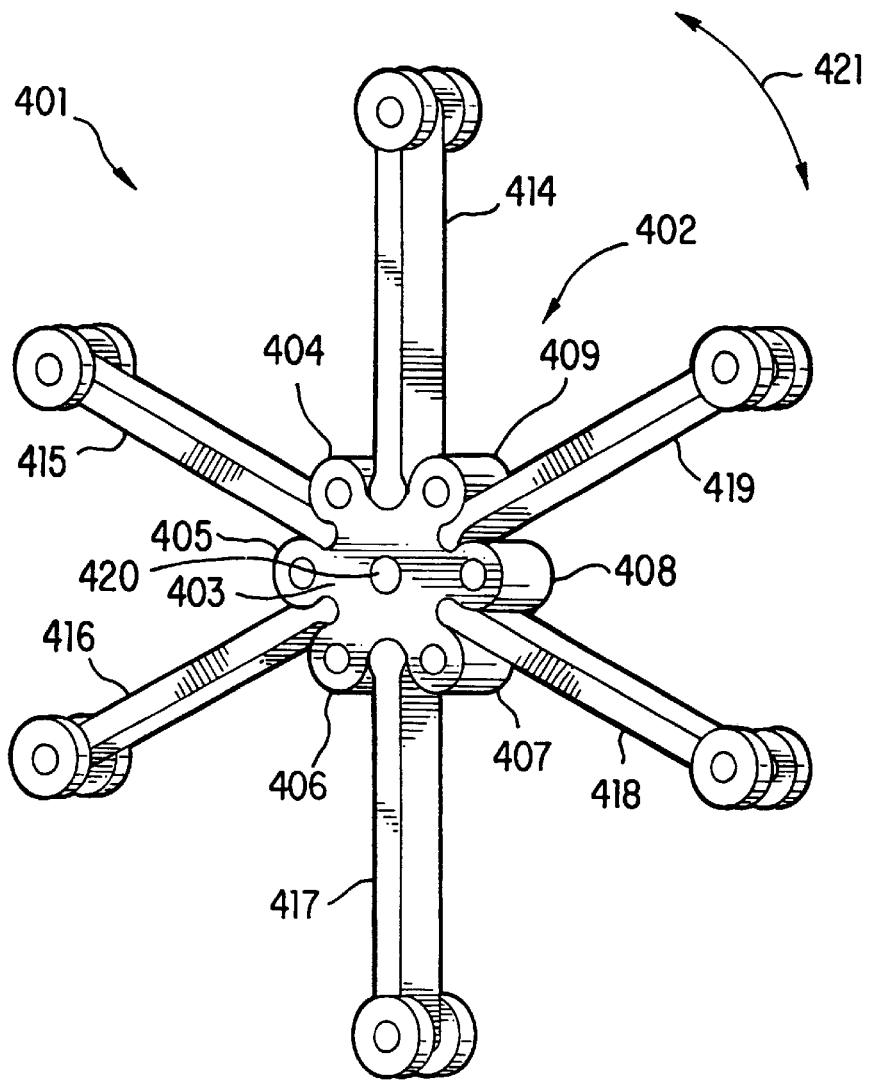
FIG. 19 shows an exemplary embodiment of an alternative actuator assembly for a heat converter engine according to the present invention.

FIG. 19 shows an actuator assembly 401 according to a first alternative embodiment of the present invention, which includes a hub and spoke assembly 402 having hub 403 and circular spokes 404–409, and actuator arms 414–419. At least a portion of actuator arms 414–419 of actuator assembly 401 are constructed of a shape memory alloy (SMA), for example, Nitinol. Hub and spoke assembly 402 of actuator assembly 401 may be considered a crank shaft and may be constructed from any suitable material that is not an SMA, for example, metal, plastic, or rubber. Actuator assembly 401 may rotate about axis 420 of hub 403 in either direction as shown by arrow 421. The purpose of rotating actuator assembly 401 will be described in greater detail below. Those skilled in the art will understand that the number of spokes and actuator arms shown in FIG. 19 are only exemplary and that there may be any number of spokes and actuator arms based on the particular application intended for the actuator assembly.

Figure 20A:
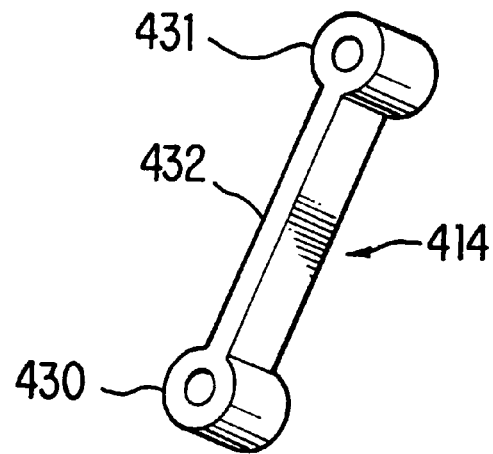
FIG. 20a shows a first view of an exemplary actuator arm of an exemplary embodiment of an actuator assembly for a heat converter engine according to the present invention.
Figure 20B:
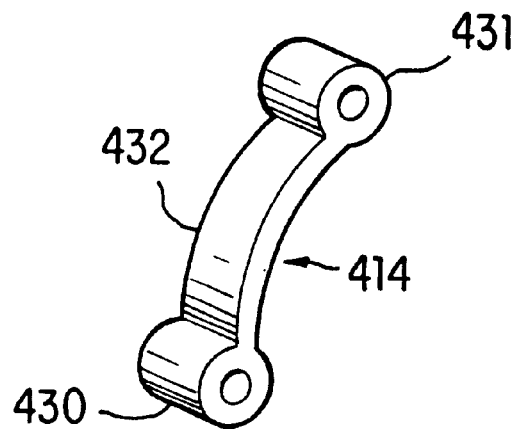
FIG. 20b shows a second view of an exemplary actuator arm of an exemplary embodiment of an actuator assembly for a heat converter engine according to the present invention.

FIGS. 20*a*–*b* show two different views of an exemplary actuator arm of actuator assembly 401 from FIG. 19, for example, actuator arm 414 which is constructed of an SMA. As described above, when an SMA is below its critical temperature, it becomes malleable and may be deformed into any shape. However, when the SMA is heated above its critical temperature the alloy undergoes a temperature related phase change allowing it to return to the mechanical configuration imposed on the material when it was annealed. FIG. 20*a* shows exemplary actuator arm 414 in its original shape, i.e., above the SMAs critical temperature. In FIG. 20*a*, exemplary actuator arm 414 has a first end 430 connected to second end 431 by a substantially straight middle section 432. Therefore, when the SMA of exemplary actuator arm 414 is heated above its critical temperature, actuator arm 414 returns to the shape illustrated in FIG. 20*a*. FIG. 20*b* shows exemplary actuator arm 414 when the SMA is below its critical temperature. Because the SMA is malleable below its critical temperature, actuator arm 414 may deform into some other shape. For example, in FIG. 20*b*, middle section 432 is shown as deformed into a curved shape. Those skilled in the art will understand that this deformation is only exemplary and that when the SMA is malleable any portion of actuator arm 414 may be deformed depending on the forces acting upon actuator arm 414. The purpose of this particular deformation will be described in greater detail below. Additionally, as shown in FIGS. 20*a* and 20*b*, the entire exemplary actuator arm 414 is constructed of an SMA. Depending on the particular purpose and use of the actuator arm, it may be possible to construct only a portion of actuator arm 414 of SMA. For example, if the only deformation required of actuator arm 414 is that shown in FIG. 20*b*, it may be possible to only construct middle section 432 of an SMA and first end 430 and second end 431 of some other material.

Figure 21A:
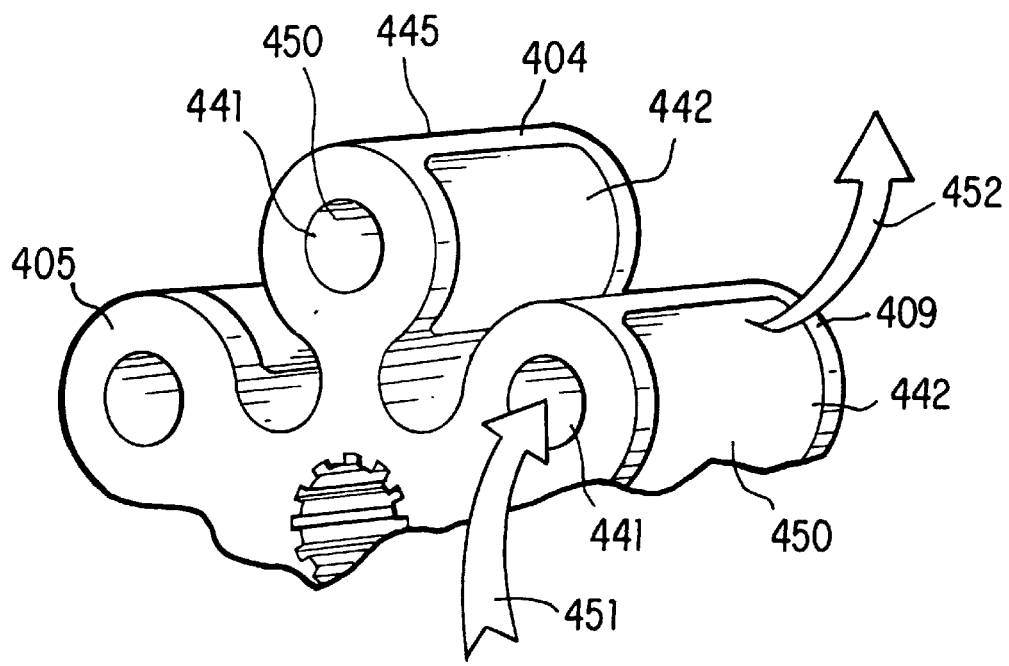
FIG. 21a shows a first exemplary embodiment of a hub and spoke assembly of an actuator assembly for a heat converter engine according to the present invention.

FIG. 21*a* shows a first exemplary embodiment of hub and spoke assembly 402 of actuator assembly 401 from FIG. 19. FIG. 21*a* shows a sectional view of hub 403 and spokes 404, 405 and 409. The features of the spokes will be described with respect to spoke 409, but these features are typical for all the spokes. Spoke 404 has a generally cylindrical shape with a solid first end and an open second end which is an intake port 441 leading to hollow inside cavity 450. Wall 445 of spoke 404 is preferably formed as a generally cylindrical surface except for a feature of interest in the present invention. Exhaust port 442 in wall 445 provides a via from hollow cavity 450 to outside of spoke 404. Intake port 441 and exhaust port 442 may be used to conduct the flow of gas or fluid heating and/or cooling mediums to the actuator arms. Intake port 441 has a generally circular shape and exhaust port 442 has a generally rectangular shape. However, the shape of intake port 441 and exhaust port 442 is not critical, as there may be different optimum shapes for various heating and cooling mediums. As will be described in greater detail below, an intake port of an actuator arm may be positioned adjacent to exhaust port 442 so the flow of the heating or cooling medium may enter the actuator arm as it leaves spoke 404. For example, hot air may flow into spoke 409 through intake port 441 in the direction of arrow 451 into hollow inside cavity 450 and out exhaust port 442 in the direction of arrow 452. Those skilled in the art will understand that any gas or liquid may be used to heat or cool the actuator arms. For example, in addition to air, water or a refrigerant may be used.

Figure 22A:
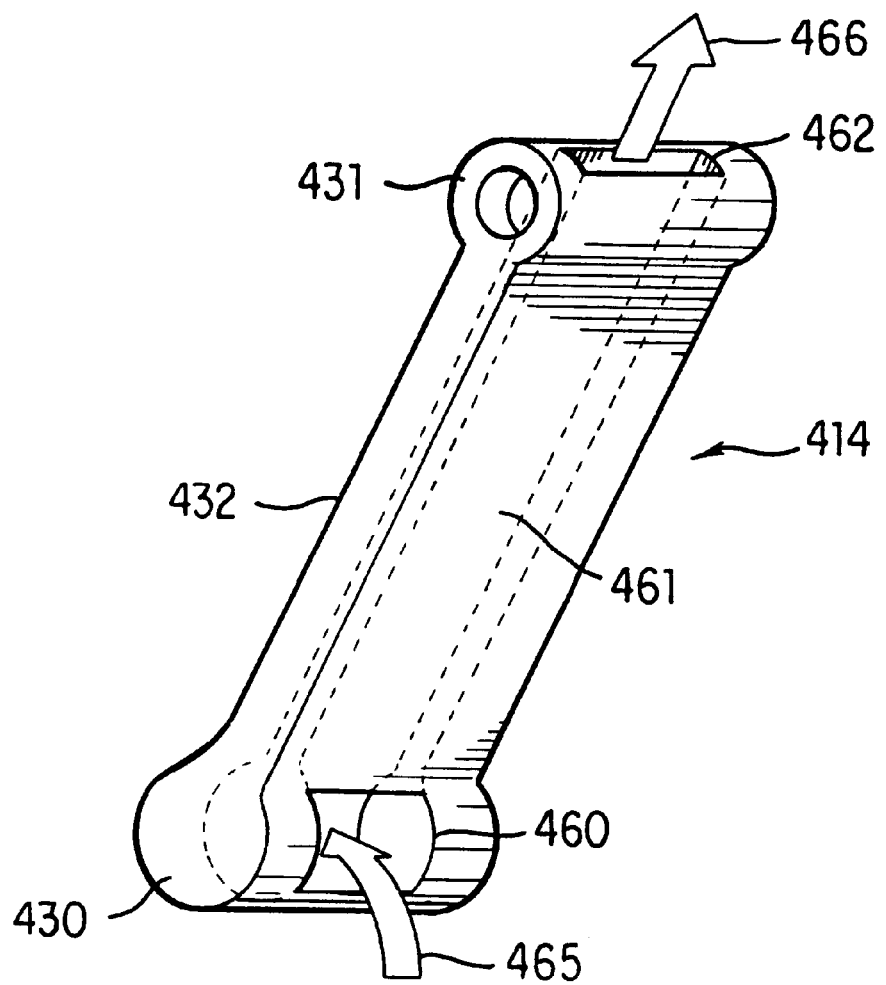
FIG. 22a shows a first exemplary embodiment of an actuator arm of an actuator assembly for a heat converter engine according to the present invention.

FIG. 22*a* shows a first exemplary embodiment of an exemplary actuator arm of actuator assembly 401 from FIG. 19, for example, actuator arm 414. This embodiment of actuator arm 414 may be used in conjunction with the exemplary hub and spoke assembly 402 described with reference to FIG. 21*a*. As described above, actuator arm 414 is constructed of an SMA and has a first end 430 connected to a second end 431 by middle section 432. First end 430 has intake port 460 which has the same general shape as exhaust port 442 of spoke 404 described with reference to FIG. 21*a*. When actuator arm 414 is positioned in conjunction with hub and spoke assembly 402, intake port 460 is adjacent to exhaust port 442 of spoke 404. Actuator arm 414 has hollow channel 461 leading from intake port 460 through the entire length of middle section 432 to exhaust port 462 in second end 431. Intake port 460, hollow channel 461 and exhaust port 462 allow the heating or cooling medium from hub and spoke assembly 402 to flow through the entire inside length of actuator arm 414 so that the SMA of actuator arm 414 is uniformly heated or cooled. For example, the hot air flow described above, may leave spoke 409 through exhaust port 442 and enter actuator arm 414 through intake port 460 in the direction of arrow 465, flow through hollow channel 461 heating the SMA to above the critical temperature, causing actuator arm 414 to return to its original shape. The hot air may continue to flow through exhaust port 462 in the direction of arrow 466 to exit actuator arm 414. Similarly, any cooling medium may also be used to cool actuator arm 414 to below its critical temperature so that it becomes malleable. Those skilled in the art will understand that the heating or cooling medium may be contained in either an open system, where the heating or cooling medium is exhausted directly into the atmosphere, or in a closed system, where the heating or cooling medium may be recycled through the system.

Figure 21B:
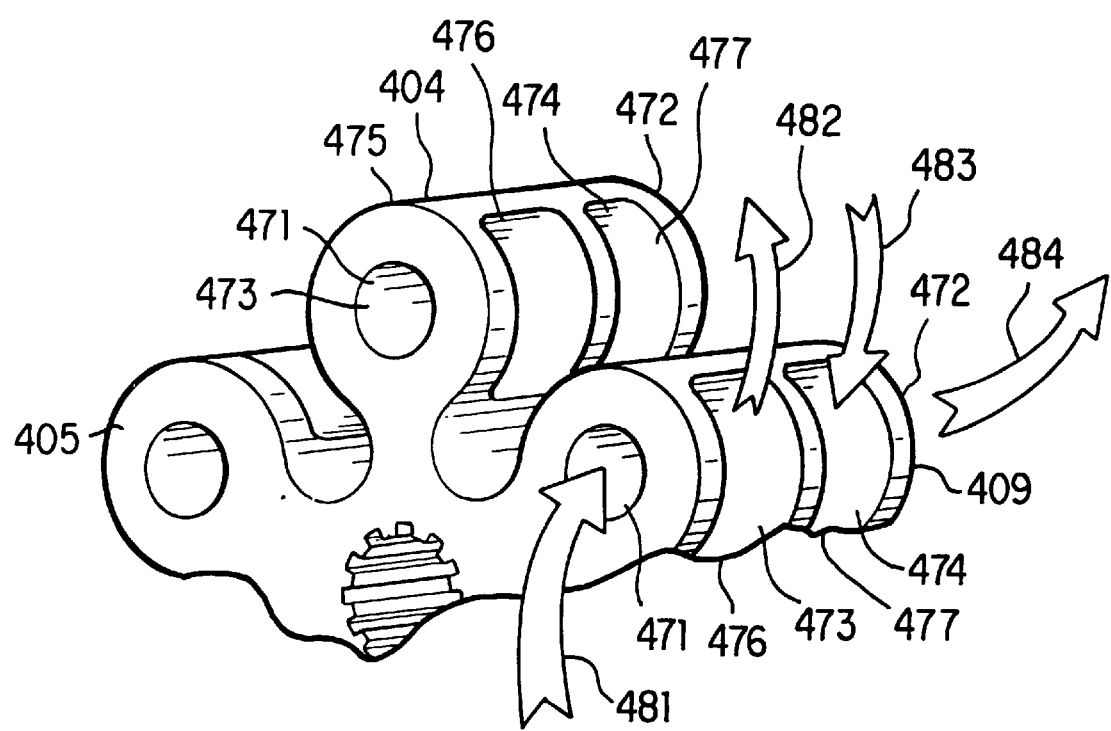
FIG. 21b shows a second exemplary embodiment of a hub and spoke assembly of an actuator assembly for a heat converter engine according to the present invention.

FIG. 21*b* shows a second exemplary embodiment of hub and spoke assembly 402 of actuator assembly 401 from FIG. 19. FIG. 21*b* shows a sectional view of hub 403 and spokes 404, 405 and 409. The features of the spokes will be described with respect to spoke 404, but these features are typical for all the spokes. Spoke 404 has a generally cylindrical shape with intake port 471 in a first end which leads to first hollow cavity 473 and exhaust port 472 in a second end which leads to a second hollow cavity 474. First hollow cavity 473 is separated from second hollow cavity 474 by a solid wall (not shown) that prevents any direct flow of heating or cooling medium between these cavities. Wall 475 of spoke 404 is preferably formed as a generally cylindrical surface except for two features of interest in the present invention. First intermediate port 476 provides a via from first hollow cavity 473 to outside of spoke 404 and second intermediate port 477 provides a via from second hollow cavity 474 to outside of spoke 404. Intake port 471, first intermediate port 476, second intermediate 477 and exhaust port 472 may be used to conduct the flow of a heating or cooling medium to and from the actuator arms of the actuator assembly. As described above, the shape of ports 471, 472, 476 and 477 is not critical, as there may be different optimum shapes depending on the particular heating or cooling medium. As will be described in greater detail below, two ports of an actuator arm may be positioned adjacent to first intermediate port 476 and second intermediate port 477 so that the flow of the heating or cooling medium may enter and exit the actuator arm. For example, hot air may flow into spoke 409 through intake port 471 in the direction of arrow 481 into first hollow cavity 473 and then out first intermediate port 476 in the direction of arrow 482. When the flow leaves first intermediate port 476 it enters a port of an actuator arm that is adjacent to first intermediate port 476. The flow of the heating or cooling medium through the actuator arm will be described in greater detail below. The flow leaves the actuator arm through a port that is positioned adjacent to second intermediate port 477. The flow leaving the actuator arm will enter second intermediate port 477 in the direction of arrow 483 into second hollow cavity 474 and out of spoke 404 through exhaust port 472 in the direction of arrow 484.

Figure 22B:
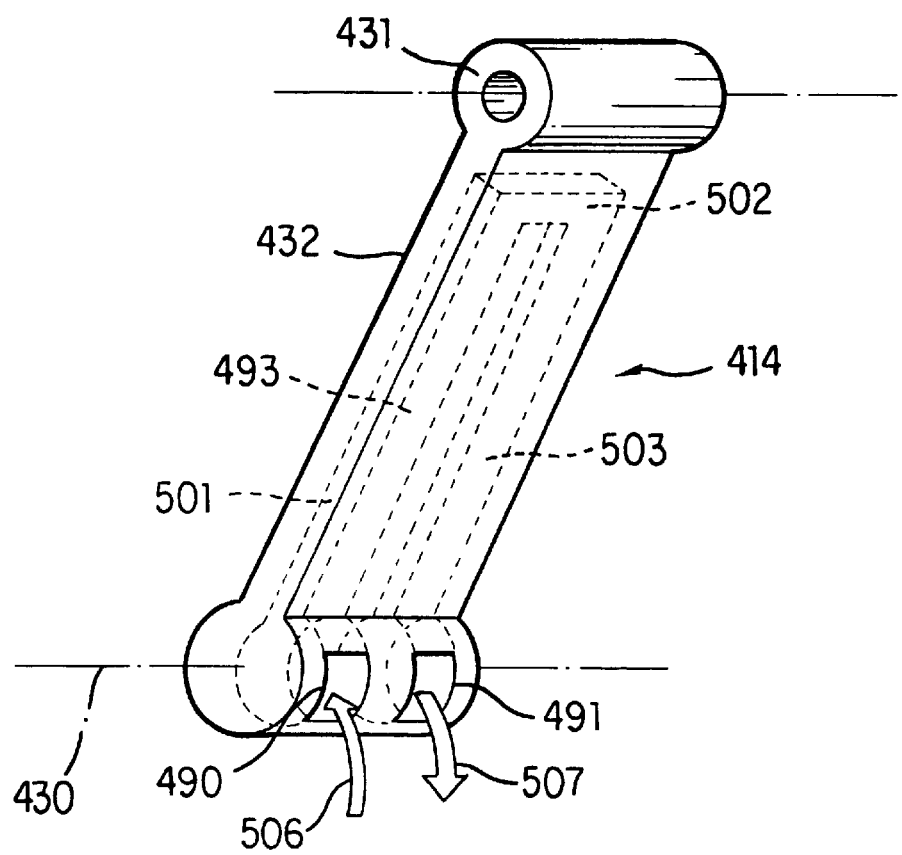
FIG. 22b shows a second exemplary embodiment of an actuator arm of an actuator assembly for a heat converter engine according to the present invention.

FIG. 22*b* shows a second exemplary embodiment of an exemplary actuator arm of actuator assembly 401 from FIG. 19, for example, actuator arm 414. This embodiment of actuator arm 414 may be used in conjunction with the exemplary hub and spoke assembly 402 described with reference to FIG. 21*b*. As described above, actuator arm 414 is constructed of an SMA and has first end 430 connected to second end 431 by middle section 432. First end 430 has intake port 490 which has the same general shape as first intermediate port 476 of spoke 404, as described with reference to FIG. 4*b*. First end 430 also has exhaust port 491 which has the same general shape as second intermediate port 477 of spoke 404, as described with reference to FIG. 21*b*. When actuator arm 414 is positioned in conjunction with hub and spoke assembly 402, intake port 490 is adjacent to first intermediate port 476 of spoke 404 and exhaust port 491 is adjacent to second intermediate port 477. Actuator arm 414 has a hollow channel 493 which has a first section 501 running from intake port 490 through middle section 432 towards second end 431. Prior to entering second end 431, hollow channel 493 has a second section 502 that is at substantially a right angle to first section 501. A third section 503 of hollow channel 493 is at substantially a right angle to second section 502 and runs to exhaust port 491. Those skilled in the art will understand that the shape of hollow channel 493 is not important, the importance of hollow channel 493 is that it delivers the flow of the heating or cooling medium to the SMA portion of actuator arm 414 so that it may be uniformly heated or cooled. For example, the hot air flow described above with reference to FIG. 21*b*, may leave spoke 409 through first intermediate port 476 and enter actuator arm 414 through intake port 490 in the direction of arrow 506, flow through channel 493 heating the SMA to above its critical temperature and causing actuator arm 404 to return to its original shape. The hot air may continue to flow through exhaust port 491 in the direction of arrow 407, exiting actuator arm 414 and reentering spoke 409 through second intermediate port 477.

Figure 23:
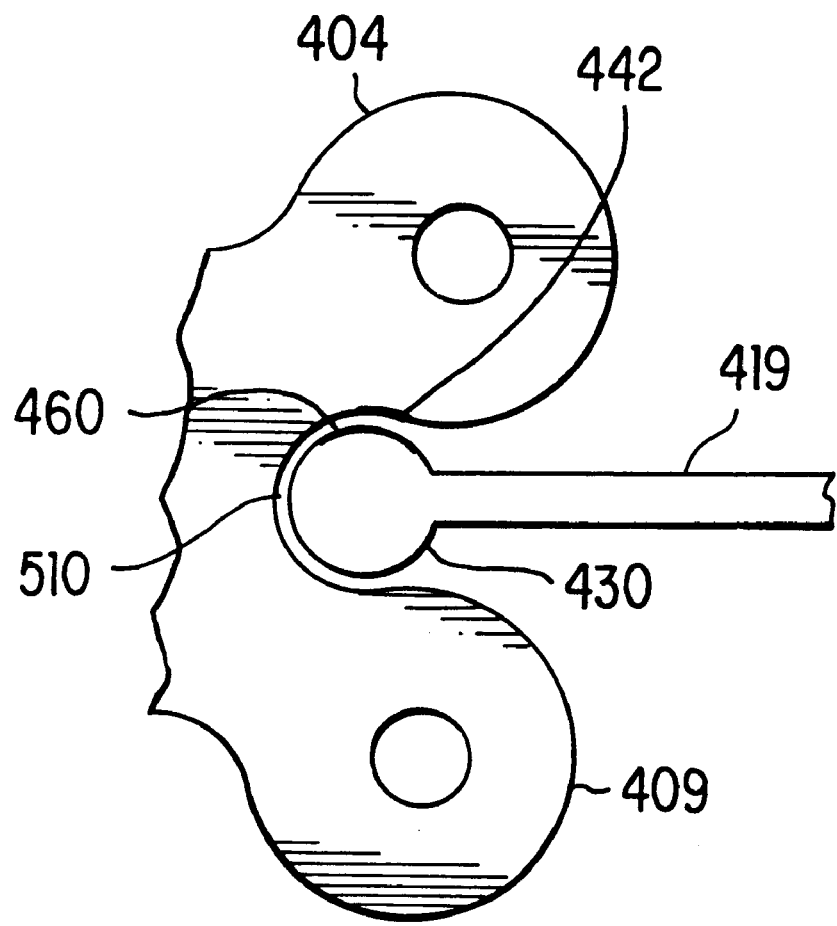
FIG. 23 shows a detail view of an actuator assembly according to the present invention.

FIG. 23 shows an exemplary manner of attaching the actuator arms to the hub and spoke assembly. In this embodiment, first end 430 of exemplary actuator arm 419 is constructed in a circular shape so that the first end 430 fits into circular cavity 510 formed by spokes 404 and 409. This construction assures that actuator arms 414–419 are not separated from hub and spoke assembly 402 in the radial direction as actuator assembly 401 rotates about axis 420 of hub 403, as described with reference to FIG. 19. As will be described in greater detail below, actuator assembly 401 may be inserted into a case to prevent actuator arms 414–419 from separating from hub and spoke assembly 402 in the axial direction. This construction allows for easy insertion and removal of actuator arms by moving first end 430 in the axial direction into and out of cavity 510. In this embodiment, exhaust port 442 of spoke 404 is adjacent to intake port 460 of actuator arm 419, as described with reference to FIGS. 21a and 22a, respectively. Similarly, this embodiment allows first intermediate port 476 of spoke 404 to be adjacent to intake port 490 of actuator arm 419 and second intermediate port 477 of spoke 404 to be adjacent to exhaust port 491 of actuator arm 419, as described with reference to FIGS. 21b and 22b. Those skilled in the art will understand that there are many possible manners of connecting the actuator arms to the hub and spoke assembly, for example, through the use of other integrally formed shapes or by using mechanical fasteners. In addition, it is possible to form the hub in such a manner that the actuator arms may be connected directly to the hub such that spokes are not necessary.

Figure 24:
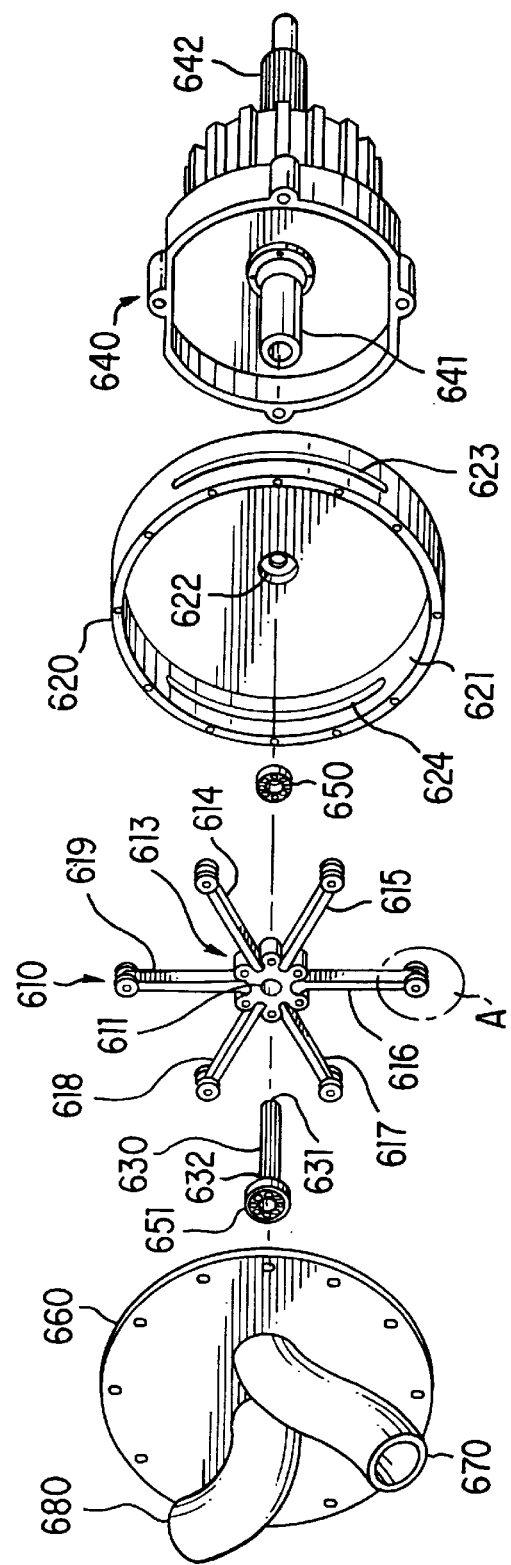
FIG. 24 shows an exemplary embodiment of a heat converter engine powered by an actuator assembly according to the present invention.

FIG. 24 shows an exemplary embodiment of heat converter engine 600 powered by an exemplary actuator assembly of the present invention. Heat converter engine 600 includes actuator assembly 610 which is positioned inside main case 620. First end 631 of drive shaft 630 is inserted through opening 611 in actuator assembly 610 and opening 622 in main case 620. Drive shaft 630 is coupled with shaft 641 of transmission 640 through first sealed bearing 650. Second sealed bearing 651 is coupled to second end 632 of drive shaft 630 so that drive shaft 630 may rotate freely. Insertion of drive shaft 630 through opening 611 in actuator assembly 610 rigidly couples drive shaft 630 to actuator assembly 610 so that as actuator assembly 610 rotates inside main case 620, this rotation is imparted to drive shaft 630. Coupling of drive shaft 630 and actuator assembly 610 may be accomplished by any conventional means. The action that drives the rotation of actuator assembly 610 will be described in greater detail below. Actuator assembly 610 is sealed within main case 620 by cover 660. As described above, cover 660 prevents the actuator arms of actuator assembly 610, for example actuator arm 614, from separating from hub and spoke assembly 613 in the axial direction. A heating medium intake 670 and a cooling medium intake 680 are connected to cover 660 which has two vias (not shown) to allow the heating and cooling mediums to enter the area of main case 620 when engine 600 is sealed.

Figure 25:
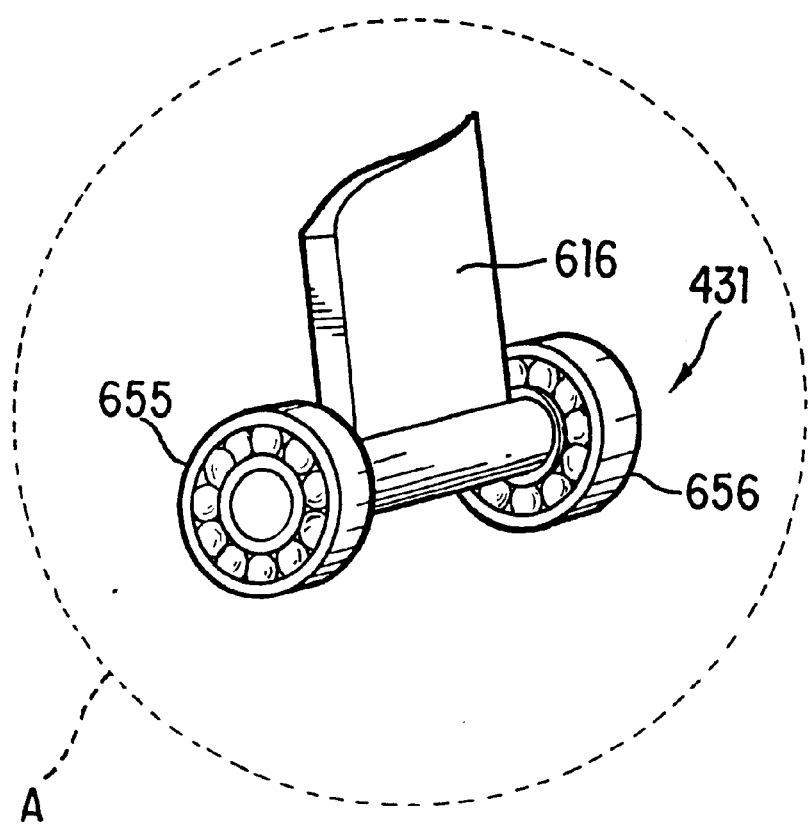
FIG. 25 shows a detail view of an exemplary actuator arm from an exemplary embodiment of a heat converter engine powered by an actuator assembly according to the present invention.

FIG. 25 shows a detail view of exemplary actuator arm 616 of actuator assembly 610 from FIG. 24. This sectional view shows second end 431 of actuator arm 616 that comes in contact with inside cylindrical wall 621 of main case 620 as shown in FIG. 24. Second end 431 of actuator arm 616 has two sealed bearings 655 and 656. As actuator assembly 610 rotates within main case 620, sealed bearings 655 and 656 come in contact with inside wall 621 and allow actuator assembly 610 to rotate freely within main case 620. Those skilled in the art will understand that this is only an exemplary embodiment of the portion of the actuator assembly that comes in contact with the main case and that there are numerous manners of constructing the actuator assembly or the main case such that the actuator assembly will rotate freely while in contact with the inside wall of the main case.

Referring back to FIG. 24, an exemplary manner of causing actuator assembly 610 to rotate within main case 620 is the following: A cooling medium is input through cooling medium intake 680. The via in cover 660 which allows the cooling medium to enter the area of main case 620 is positioned so that the cooling medium will enter an intake port of hub and spoke assembly 613 of actuator assembly 610, for example, intake port 441 as described with reference to FIG. 21a. The cooling medium will then flow through hub and spoke assembly 613 and into actuator arms 614–619, cooling actuator arms 614–619 below the critical temperature of the SMA, causing actuator arms 614–219 to become malleable and able to be deformed from their original shape. As actuator assembly 610 rotates inside main case 620, only one intake port of a spoke will be positioned adjacent to the via at each instant of time. Thus, cooling medium intake 680, the via and the intake port of the spoke should be sized so that during the single pass in each rotation, enough cooling medium may flow into the actuator arm to cool it below its critical temperature. However, those skilled in the art will understand that it may be possible to design an actuator assembly where each actuator arm does not need to be cooled to below its critical temperature during each rotation of the actuator assembly.

Figure 26:
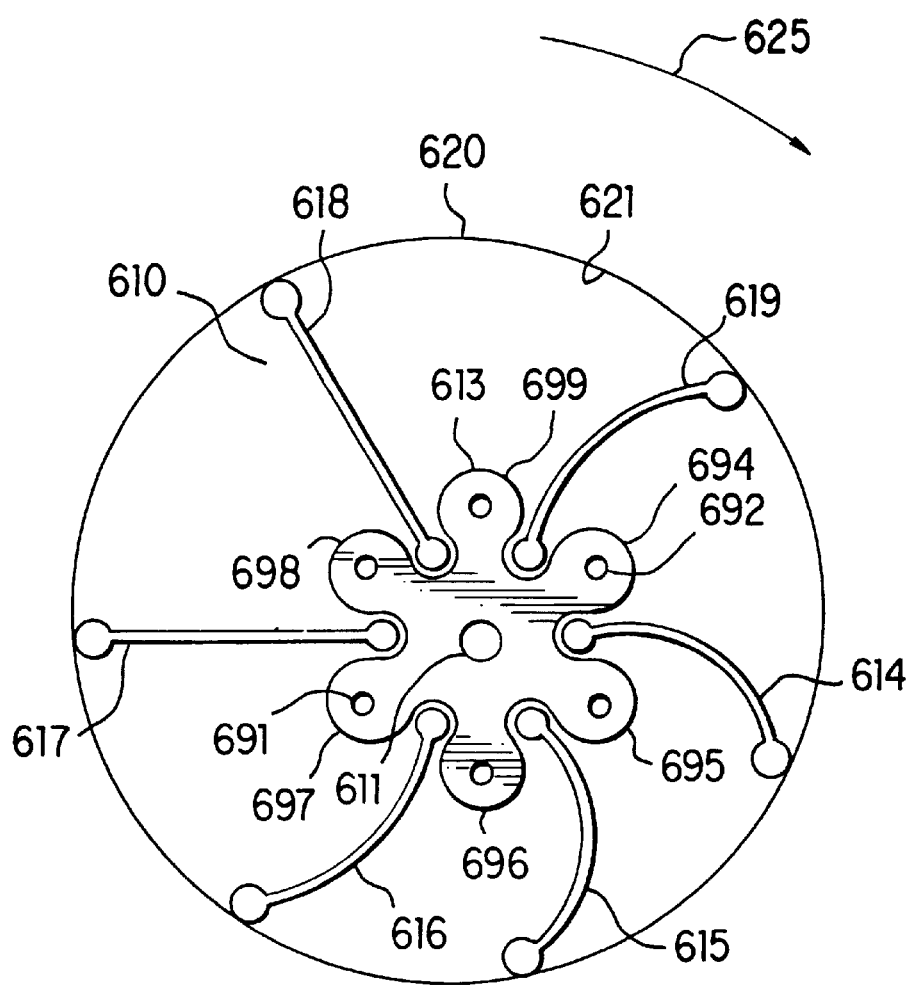
FIG. 26 shows an exemplary embodiment of an actuator assembly and a main case from an exemplary embodiment of a heat converter engine according to the present invention.

In this embodiment, the original shape of actuator arms 614–619 is substantially straight as shown in FIG. 24. When the actuator arms are malleable, the force exerted on the arms by coming in contact with inside wall 621 of main case 620 will cause a curvature to be formed in actuator arms 614–619, as described with reference to FIG. 20b. Those skilled in the art will understand that, in operation, all of actuator arms 614–619 of actuator assembly 610 will not simultaneously be in their original shape as shown in FIG. 24. Some of the arms may be cooled to below the critical temperature of the SMA and have the curved shape described above. In this embodiment, opening 611 of actuator assembly 610 will not be centered with respect to main case 620. For example, with reference to FIG. 26, actuator assembly 610 is shown inserted into main case 620. As shown, actuator arms 617 and 618 are in their original substantially straight shape, actuator arms 616 and 619 have a slight curvature from the force exerted on these arms from inside wall 621 of main case 620, and actuator arms 614 and 615 have the greatest curvature. Thus, opening 611 in hub and spoke assembly 613 of actuator assembly 610 is not centered in main case 620 because of the varying degrees of curvature on actuator arms 614–619. However, those skilled in the art will recognize that opening 611, while not centered within main case 620, will remain at a fixed position while actuator assembly 610 rotates. For example, as actuator assembly 610 rotates, actuator arms 617 and 618 that are shown in their original substantially straight shape will be cooled to below their critical temperature and the force exerted by inside wall 621 of main case 620 will cause these actuator arms to become curved. At the same time, actuator arms 614 and 615 that are in the fully curved shape will be heated above the critical temperature causing these actuator arms to return to their original substantially straight shape. When this occurs the position of actuator arms 614 and 615 will essentially be interchanged with the position of actuator arms 617 and 618, respectively. Thus, actuator assembly 610 will have rotated one half rotation, but the axis of rotation about opening 611 will not change. To account for this offset of the axis of rotation from the center of main case 620, opening 622 of main case 620 may be offset from center to be in line with opening 611 of actuator assembly 610.

Again referring back to FIG. 24, when the cooling medium is exhausted from the actuator arm, it flows out of main case 620 through exhaust port 623. Hub and spoke assembly 613 and actuator arms 614–619 may be similar to those described with reference to FIGS. 21a and 22a, where the heating or cooling medium is exhausted from the actuator assembly through an exhaust port on the actuator arm. For example, exhaust port 62 of actuator arm 414 in FIG. 22a. Those skilled in the art will understand that hub and spoke assembly 613 and actuator arms 614–619 may also be similar to those described with reference to FIGS. 21b and 22b, where the heating or cooling medium is exhausted from the hub and spoke assembly rather than the actuator arm. For example, exhaust port 472 of the hub and spoke assembly in FIG. 21b. In this case, exhaust ports 623 and 624 of main case 620 may be placed in a different position to accommodate the exhaust of the heating or cooling medium.

Similar to the intake of the cooling medium, a heating medium is input through heating medium intake 670. The via in cover 660 which allows the heating medium to enter the area of main case 620 is also positioned so that the heating medium will enter an intake port of the hub and spoke assembly 613 of actuator assembly 610, for example, intake port 441 as described with reference to FIG. 21a. The heating medium will then flow through hub and spoke assembly 613 and into actuator arms 614–619, heating the actuator arms above the critical temperature of the SMA and causing the actuator arms to resume their original shape. As the actuator arms return to their original substantially straight shape, the force exerted by the actuator arms in the radial direction against inside wall 621 of main case 620 will cause the entire actuator assembly to rotate. Concurrently, the rigidity of the actuator arms that are above the critical temperature will cause the actuator arms that are below the critical temperature to be deformed into the curved shape by being forced against inside wall 621 of main case 620. The complete action of rotation will be described in more detail below. Also, as described above, the heating medium may be exhausted from main case 620 through exhaust port 624.

Referring back to FIG. 26, the rotation of actuator assembly 610 within main case 620 will be described in more detail with reference to an exemplary actuator arm. The exemplary actuator arm may be considered to start at the position of actuator arm 617, where it has been previously heated above the critical temperature of the SMA and is in its original substantially straight shape. As actuator assembly 610 rotates in the direction of arrow 625, the intake port of the spoke that distributes the heating and cooling medium to the exemplary actuator arm, for example, intake port 691 of spoke 697 for actuator arm 617, aligns with the via allowing the cooling medium to flow into the spoke. The spoke distributes the cooling medium flow to the exemplary actuator arm, for example, in the manners described above with reference to FIGS. 21a–b and 22a–b. As described above, the via and intake port should be sized so that a sufficient amount of cooling medium flows into the spoke while the via and intake port are aligned to cool the exemplary actuator arm below its critical temperature. As actuator assembly 610 continues to rotate in the direction of arrow 625, the exemplary actuator arm rotates into the position of actuator arm 618. In this position, the cooling medium is cooling the actuator arm, but it is not yet below the critical temperature, therefore, the exemplary actuator arm remains in its substantially straight original shape. When the exemplary actuator arm is in the position of actuator arms 617 and 618, it is rigid and exerts force in the radial direction against inside wall 621 of main case 620. Concurrently, this rigidity forces actuator arms opposite those in the positions of actuator arms 617 and 618, for example, actuator arms 614 and 615 to be deformed into a curved shape to account for the rigidity. As actuator assembly 610 continues to rotate in the direction of arrow 625, the exemplary actuator arm moves into the position of actuator arm 619. Between the positions of actuator arm 618 and 619, the cooling medium has cooled the exemplary actuator arm to below the critical temperature so that, when the exemplary actuator arm reaches the position of actuator arm 619 it is beginning to be deformed into the curved shape. Actuator assembly 610 continues to rotate in the direction of arrow 625 and the exemplary actuator arm rotates into the position of actuator arm 614, where the force exerted by a rigid actuator arm in the position of actuator arm 617 through hub and spoke assembly 613 causes the exemplary actuator arm to be deformed into the greatest curvature.

Continued rotation of actuator assembly 610 in the direction of arrow 625 causes the intake port of the spoke that distributes the heating and cooling medium to the exemplary actuator arm, for example intake port 692 of spoke 694 for actuator arm 614, to align with the via allowing the heating medium to flow into the spoke and then be distributed to the exemplary actuator arm. Again, the via and the intake port should be sized so that a sufficient amount of heating medium enters the spoke while the intake port and via are aligned to heat the exemplary actuator arm above the critical temperature. As actuator assembly 610 continues to rotate in the direction of arrow 625, the exemplary actuator arm rotates into the position of actuator arm 615 where the heating medium has not yet heated the exemplary actuator arm above the critical temperature. The exemplary actuator arm remains in the position of greatest curvature because of the force exerted by a rigid actuator arm in the position of actuator arm 618. Continued rotation of actuator assembly 610 causes the exemplary actuator arm to move between the position of actuator arms 615 and 616, where the heating medium has heated the exemplary actuator arm above the critical temperature so that the exemplary actuator arm begins to return to its original shape. The action of the actuator arm resuming it original shape causes a force to be exerted in the radial direction against inside wall 621 of main case 620, which, in turn, causes actuator assembly 610 to rotate. Finally, as actuator assembly 610 continues to rotate, the exemplary actuator arm resumes its original shape when it reaches the position of actuator arm 617.

Thus, rotation of actuator assembly 610 is accomplished by continuous heating and cooling of actuator arms 614–619, where the force of the actuator arms returning to their original shape causes the entire assembly to rotate. Those skilled in the art will understand that the original and deformed shapes described above, i.e., straight and curved, are only exemplary and that other shapes may also be used for the actuator arms to accomplish the same action of causing the actuator assembly to rotate. Referring back to FIG. 24, the rotation of actuator assembly 610 also causes drive shaft 630 to rotate which, in turn, causes shaft 641 of transmission 640 to rotate. Through internal gearing in transmission 640, the rotation of shaft 641 is imparted to rotor 642 of transmission 640. The rotation of rotor 642 may be used to drive or power any number of mechanisms.

Figure 27:
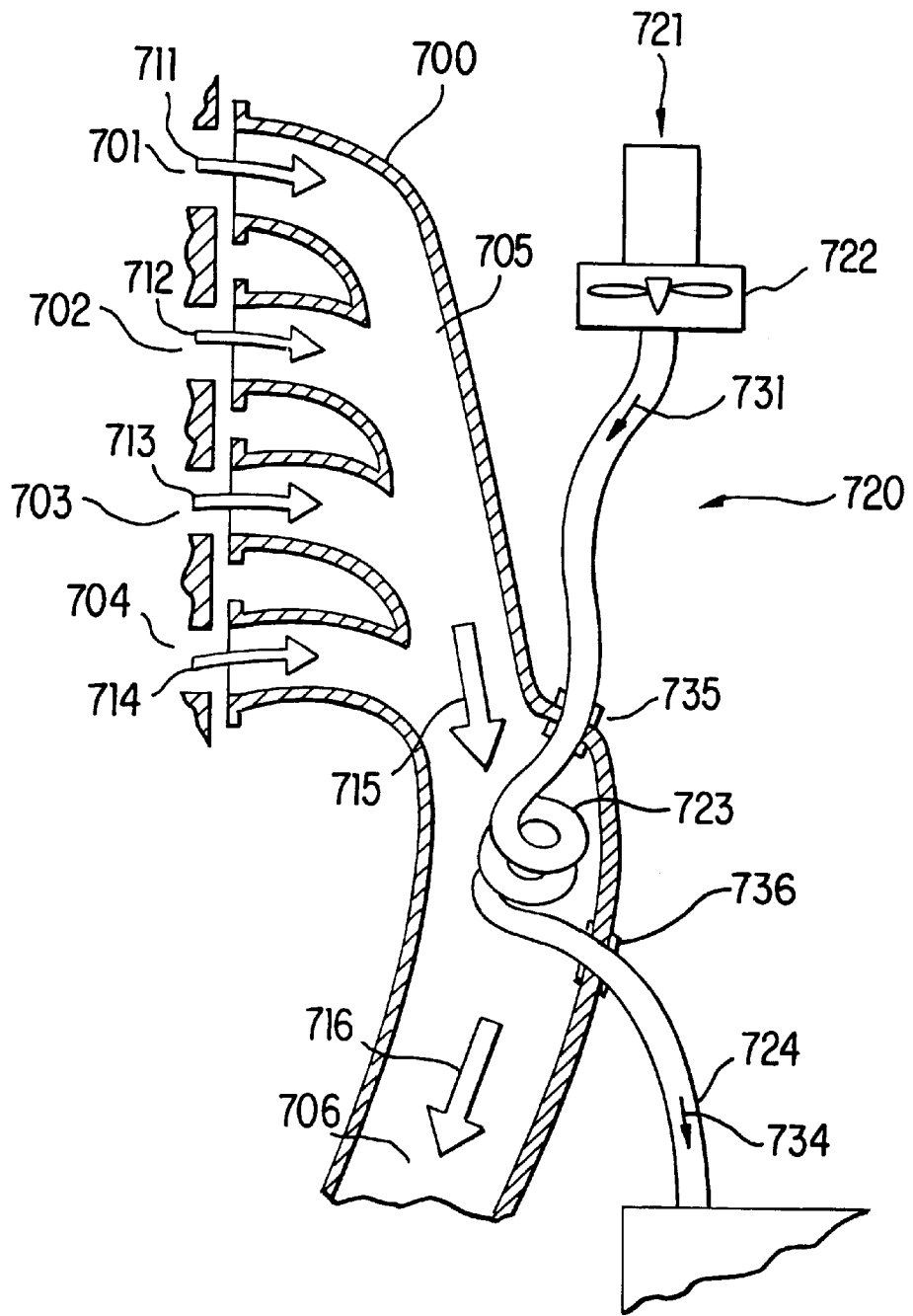
FIG. 27 shows an exemplary embodiment of a system for heating a heating medium to be used in the present invention.

FIG. 27 shows an exemplary embodiment of a system for heating and delivering a heating medium to the intake of the heat converter engine. FIG. 27 shows exhaust manifold 700 having intake ports 701–704, main header 705 and exhaust port 706. Hot exhaust air from the cylinders of an internal combustion engine enters intake ports 701–704 in the direction of arrows 711–714, flows through main header 705 in the direction of arrow 715 and out exhaust port 706 in the direction of arrow 716. In addition to exhaust manifold 700, this exemplary embodiment also has medium delivery system 720, having an intake port 721, pump 722, heating coil 723 and exhaust port 724. A liquid heating medium enters medium delivery system 720 through intake port 721 and is pumped in the direction of arrow 731 by pump 722. The heating medium entering medium delivery system 720 is cool, or at least not heated to its ideal temperature. As shown in FIG. 27, at point 735, medium delivery system 720 enters the boundary of exhaust manifold 700 in the area of main header 705. In this area, medium delivery system 720 has heating coil 723. As the heating medium flows through heating coil 723, the flow of hot exhaust air in header 705 heats the heating medium in heating coil 723 to its ideal temperature. Medium delivery system 720 then exits the boundary of exhaust manifold 700 at point 736 and the heated heating medium flows in the direction of arrow 734 out exhaust port 724 of medium delivery system 720. The heating medium may then be delivered to the heating medium intake of the heat converter engine, for example heating medium intake 670 of FIG. 24.

Medium delivery system 720 may also be adapted for use by a gaseous heating medium by simply using a fan in place of pump 722 to cause gas flow through the system. Alternatively, it may also be possible to use the hot exhaust flow from exhaust manifold 700 as a direct input to the heating medium intake of the heat converter engine, thereby eliminating medium delivery system 700. Similarly, it may also be possible to have a medium delivery system for delivering the cooling medium to the cooling medium intake of the heat converter engine, for example cooling medium intake 680 of FIG. 24. For example, the flow of cooling medium may be cooled by a compressor/condenser unit prior to entering the cooling medium intake. An interesting feature of the cooling medium delivery system may be that the compressor/condenser unit may be powered by the heat converter engine, after initial start-up, thereby allowing the entire system to be self-contained.

Figure 28:
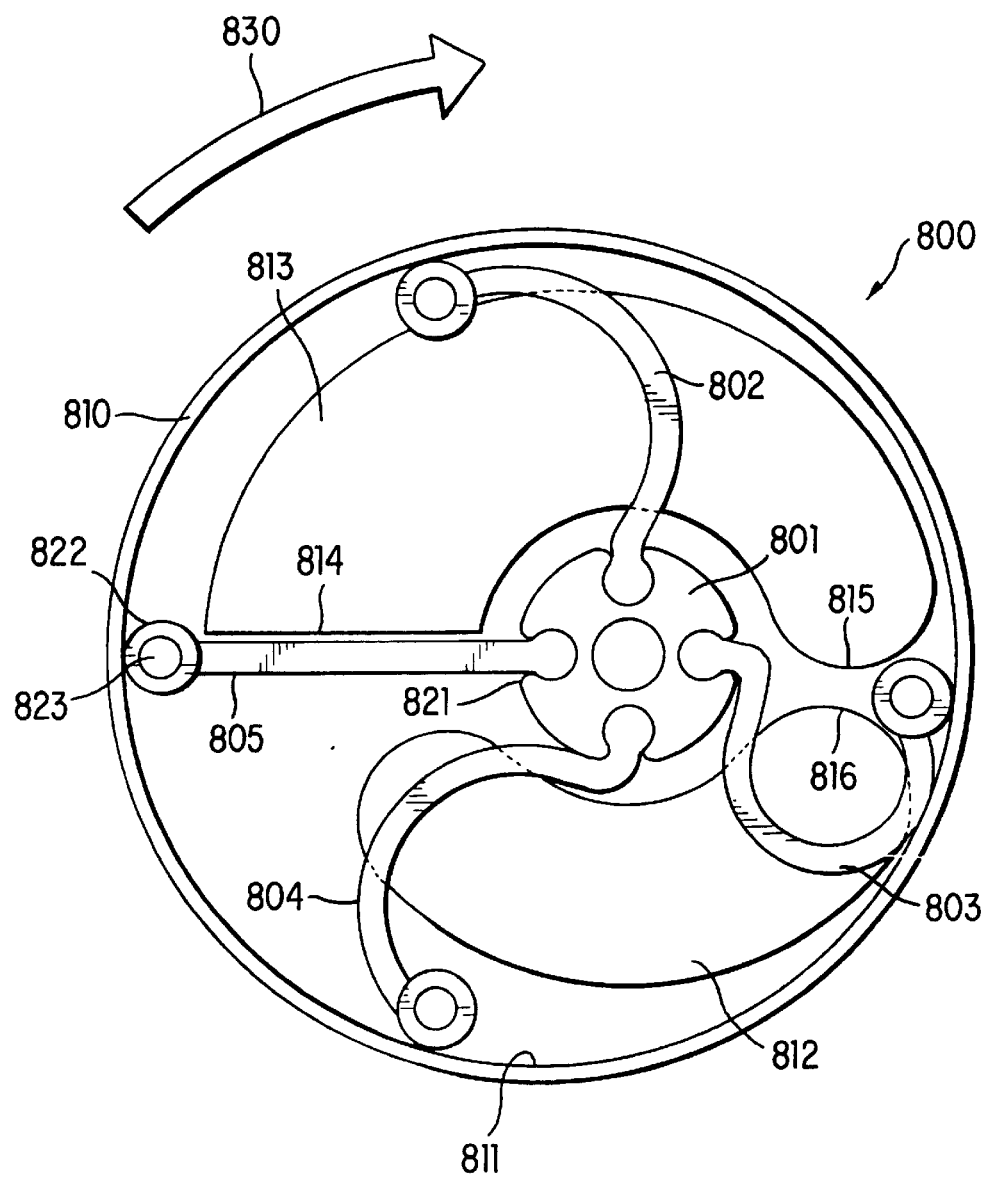
FIG. 28 shows a second exemplary embodiment of an actuator assembly according to the present invention.

FIG. 28 shows a first alternative embodiment of an SMA actuator assembly of the present invention. Actuator assembly 800 has hub and spoke assembly 501 and actuator arms 802–805 and is positioned within main case 810. Each of actuator arms 802–805 is constructed of an SMA and has a first end 821 for coupling with hub and spoke assembly 801 and a second end 822 having sealed bearing 823 that comes in contact with the inside wall 811 of main case 810, allowing actuator assembly 800 to freely rotate within main case 810. Actuator assembly 800 operates in the same manner as the previously described actuator assembly in that the rotation of actuator assembly 800 within main case 810 is caused by continuous heating and cooling of actuator arms 802–805. When actuator arms 802–805 are cooled they become malleable and are deformed into the curved shape as shown by actuator arms 802–804, with actuator arm 803 having the greatest degree of curvature. As actuator arms 802–805 are heated, they resume their original substantially straight shape, as shown by actuator arm 805. As described above, this action of actuator arms 802–805 resuming their original shape causes a force to be exerted in the radial direction causing actuator assembly 800 to rotate within main case 810.

In this embodiment, actuator arms 805—805 are heated and cooled by direct application of the heating and cooling mediums to the exterior of actuator arms 802–805. Main case 810 has a hot gas port 812 and a cold gas port 813 which effect the operation of actuator assembly 800 as follows: An actuator arm in the position of actuator arm 805 has been heated and is in its original substantially straight shape. As actuator assembly 800 rotates in the direction of arrow 830, the actuator arm crosses the boundary 814 of cold gas port 813 and an incoming stream of cold gas flows over the actuator arm cooling it below the critical temperature of the SMA. By the time the actuator arm is cooled below the critical temperature, it has rotated into the position of actuator arm 802 and has started to deform into the curved shape. As actuator assembly 800 continues to rotate in the direction of arrow 830 the actuator arm is further deformed into a more pronounced curvature that coincides with boundary 815 of cold gas port 813. Actuator assembly 800 continues to rotate in the direction of arrow 830 and the actuator arm crosses boundary 816 of hot gas port 812 into the position as shown by actuator arm 803. In this position, an incoming stream of hot gas flows over the actuator arm heating it above the critical temperature of the SMA. By the time actuator assembly 800 has rotated in the direction of arrow 830 so that the actuator arm has reached the position as shown by actuator arm 804, it is heated above the critical temperature and is beginning to resume its original shape. The actuator arm continues to rotate in the direction of arrow 830 until it has fully regained its original shape as shown by actuator arm 805. This embodiment of the actuator assembly and main case may be used in an heat converter engine similar to the one described with reference to FIG. 24.

Figure 29:
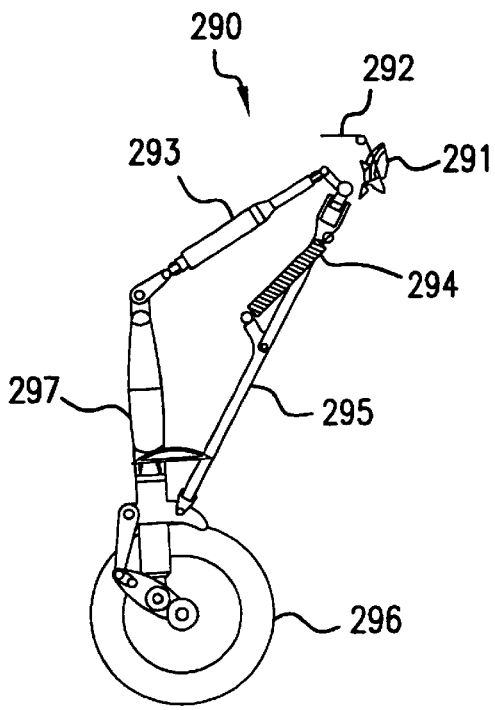
FIG. 29 shows an aircraft landing gear in an extended position in accordance with an alternative embodiment of the present invention.
Figure 30:
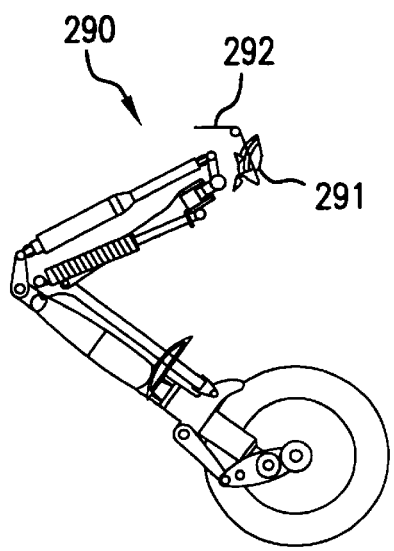
FIG. 30 shows an aircraft landing gear in a semi-extended position in accordance with an alternative embodiment of the present invention.
Figure 31:
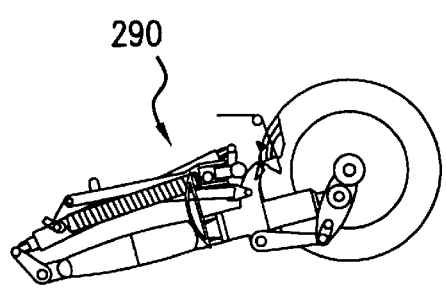
FIG. 31 shows an aircraft landing gear in a retracted position in accordance with an alternative embodiment of the present invention.

FIGS. 29–31 provide a side view of an aircraft landing gear 290, as may be embodied in an alternative embodiment of the present invention. In these figures, a Shape Memory Spring (SMS) strut 293, a locking latch 291, a nitrogen filed shock absorber 297, a retracting strut 295, a tire 296, and a locking spring 294 are shown. FIG. 29 illustrates the landing gear 290 in a fully deployed position, FIG. 30 shows the landing gear in a semi-retracted position and FIG. 31 shows the landing gear in a fully retracted position. The aircraft landing gear 290 in this embodiment may be employed in the nose of large aircraft and as the main landing gear of lighter aircraft. Exemplary aircraft include airplanes, helicopters, gliders, as well as all others that employ retractable landing gear.

The landing gear 290 may be deployed and locked in an extended position during takeoff and landing and may be raised during flight in a retracted, folded, and stowed away position. In this embodiment, the gear may be raised by elongating the SMS strut 293. Then, once the landing gear 290 is fully retracted, it may be locked in place by the locking latch 291.

In this embodiment the SMS strut 293 may contain a shape memory alloy (SMA) that expands when heated and contracts when cooled. This shape memory alloy may be sized to develop the required forces necessary to raise the landing gear 290. For example, the cross-sectional area may be sized to be able to develop forces greater than two times those necessary to raise the landing gear. This level of force is preferred in this embodiment in order to provide for a safety factor and also in order to overcome other dynamic forces encountered shortly after takeoff that may impede the retraction of the landing gear. Similarly, the length of the shape memory alloy may also be sized such that the distance of travel of the landing gear is closely correlated to the distance of maximum expansion of the shape memory alloy. In other words, when the shape memory alloy within the SMS strut 293 is activated its maximum distance of expansion may be 20% greater than the maximum distance required to fully retract the landing gear 290 into the aircraft's fuselage. By considering the maximum length of the SMA, the forces placed on the landing gear, while the SMS strut is active and the landing gear 290 is in its retracted position, can be controlled.

The SMA alloy, resident within the SMS strut 292, may be heated by various methods including passing an electrical current through it, by positioning it near a heat generating resistor or by passing thermally charged fluids over and around it. These sources of heat may communicate with the SMS strut via a shape memory spring strut activation line (not shown). In each case and in the various other plausible methods of heating the shape memory alloy, as the shape memory alloy is heated it will expand and, acting through the various members and linkages of the landing gear, cause the landing gear to retract. Once locked in the retracted position, via a locking hatch or other apparatus, the shape memory alloy may be allowed to cool. Once cooled, the SMA will no longer place a lifting force on the landing gear. Thus, in the retracted state the landing gear is maintained in a folded position via the locking latch 291. When required, the landing gear 290 may be lowered by unlocking the locking latch 291 and allowing gravitational and locking spring 294 forces to lower it. The locking latch 291 may be unlocked by pulling on chord 292 although numerous other embodiments are also plausible for releasing the landing gear including the use of additional SMAs, SMSs, locking solenoids or other locking mechanisms. Once released and free to move, forces generated by spring 294 may supplement the gravitational forces that will urge the landing gear 290 back into its fully deployed and locked position.

Figure 32:
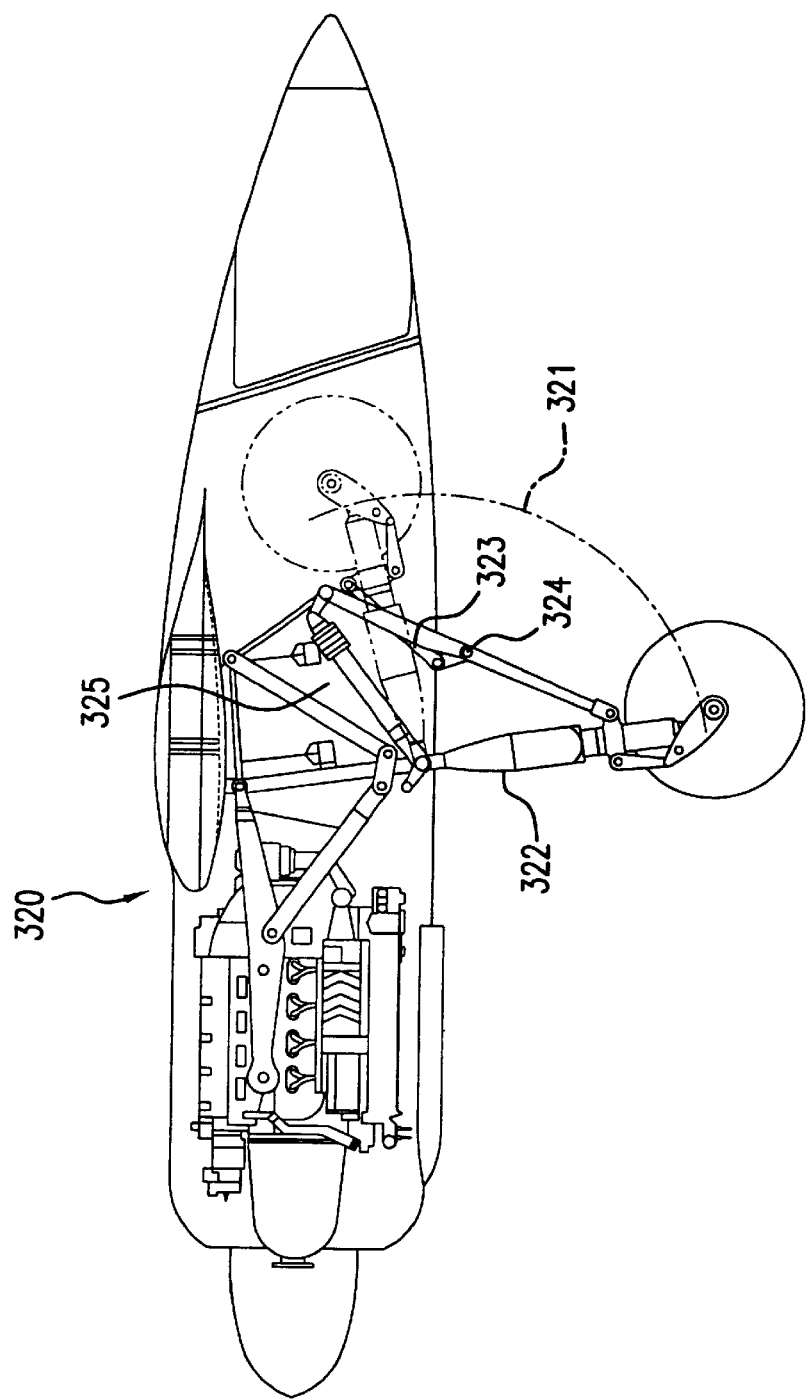
FIG. 32 shows an airplane landing gear in an extended position in accordance with an alternative embodiment of the present invention.

FIG. 32 is a side view of the landing gear employing an SMS strut activated by an internal shape memory alloy as installed in a nose landing gear of a light passenger airplane. FIG. 32 contains the nose 320 of a light passenger airplane, an SMS strut 325, a nitrogen filled shock absorber 322, a retracting strut 324, and a locking spring 323. It also illustrates a line of travel of the landing gear with dashed line 321. As can be seen in FIG. 32 the line of travel 321 creates an arc like curve in this embodiment.

In addition to the embodiments described above, numerous other embodiments are also plausible to facilitate the raising and lowering of aircraft landing gear. For example, the struts and springs may be reconfigured such that the contraction of SMS strut generates the required forces to raise the landing gear. Furthermore, rather than using electrical currents to facilitate the expansion of the struts other sources of thermal energy may be employed. For example heated air may be forced across the shape memory alloy in the strut to cause it to expand in a different embodiment, likewise other fluids, such as water or oil may be used to heat the shape memory alloy. Moreover, in these embodiments, a shape memory spring strut activation line (not shown) may in fluid communication with a pump that urges these compressible and non-compressible fluids towards the SMA. Once the fluids reach the SMA it will expand in reaction to the thermal energy transferred by the fluid.

Figure 33:
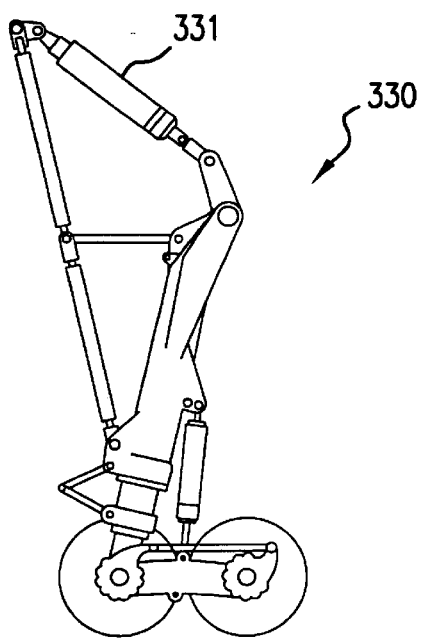
FIG. 33 shows an aircraft landing gear in an extended position under static load in accordance with an alternative embodiment of the present invention.
Figure 34:
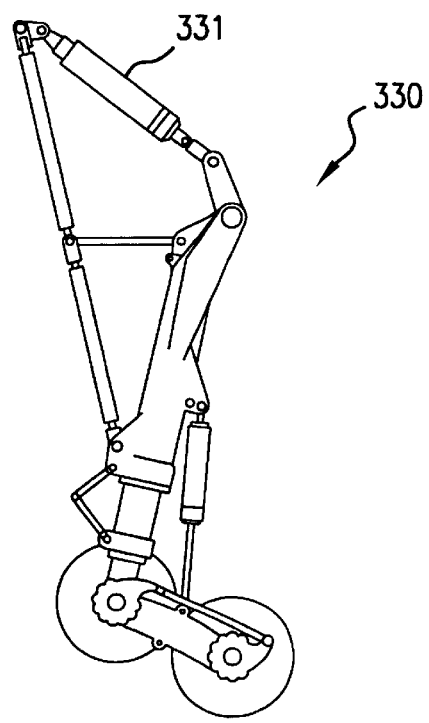
FIG. 34 shows an aircraft landing gear in an extended airborne position in accordance with an alternative embodiment of the present invention.
Figure 35:
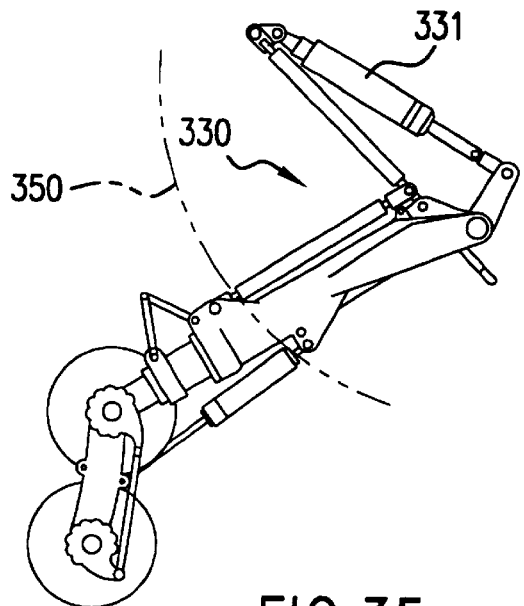
FIG. 35 shows an aircraft landing gear in a semi-extended position in accordance with an alternative embodiment of the present invention.
Figure 36:
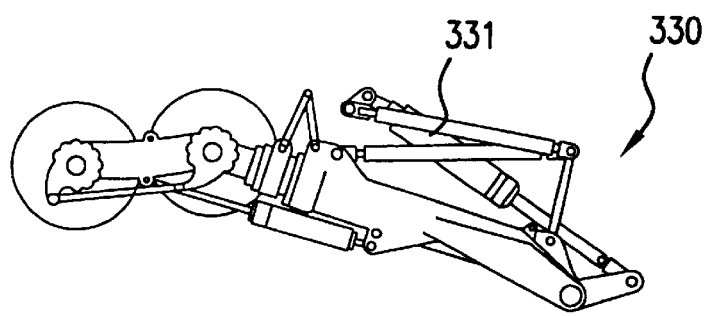
FIG. 36 shows an aircraft landing gear in a retracted position in accordance with an alternative embodiment of the present invention.

FIGS. 33–36 show a landing gear as may be employed in a larger aircraft. FIG. 33 shows the landing gear 330 in a fully deployed position under static load; FIG. 34 shows the landing gear 330 in a fully deployed position when the aircraft is airborne; FIG. 35 shows the landing gear 330 in a partially retracted position; and, FIG. 36 shows the landing gear 330 in a fully retracted position. As described above, the landing gear contains an SMS strut 331 that generates the lifting force to lift the undercarriage via the expansion of the shape memory alloy resident within it. Like the embodiment described above, the shape memory alloy may be activated through various heat introduction methodologies including electrical current and thermal transfer fluids. In this embodiment, rather than having a locking mechanism hold the gear in a retracted position the SMS strut is activated throughout the entire flight time to keep the landing gear retracted. Then, when necessary, the shape memory alloy is allowed to cool and, thus, allow the landing gear to retract back down into a locked position.

Figure 37:
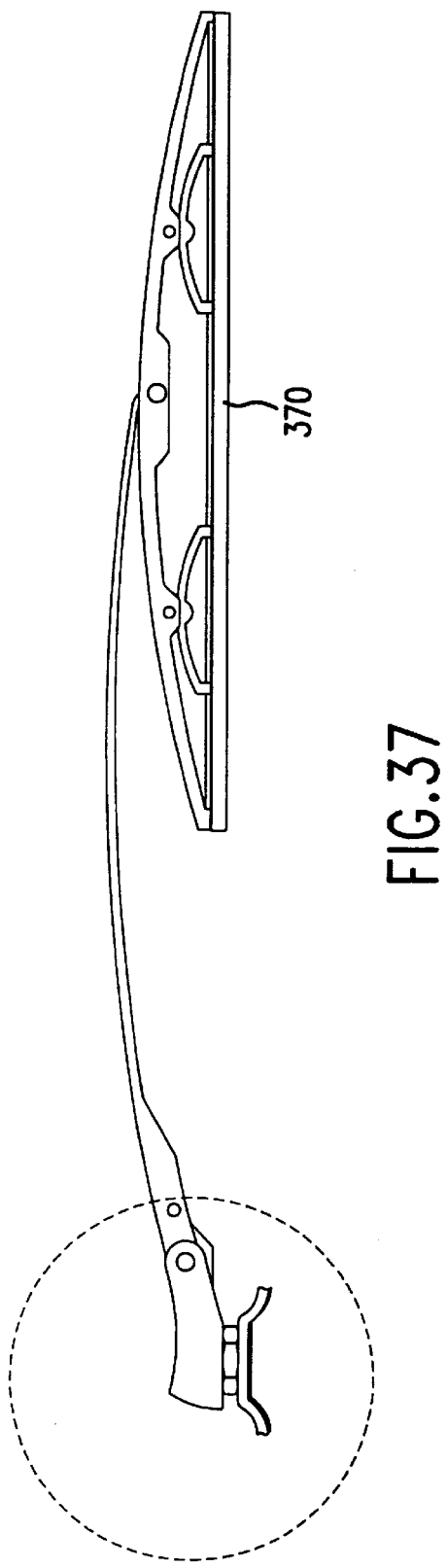
FIG. 37 shows a motor vehicle wiper arm and identifies the enlarged area seen in FIGS. 38 and 39.

FIG. 37 is a profile view of a windshield wiper arm as may be employed by a motor vehicle such as a motorcycle, a motor boat, and an automobile in accord with an alternative embodiment of the present invention. During high speeds the airflow over the windshield of a motor vehicle (not shown) may lift the wiper blade 370 off of the glass and thereby reduce the wiper blade's 370 effectiveness. In order to overcome these high speed lifting forces, a downward force, opposing the lifting force, may be generated to hold the wiper blade 370 against the glass.

Figure 38:
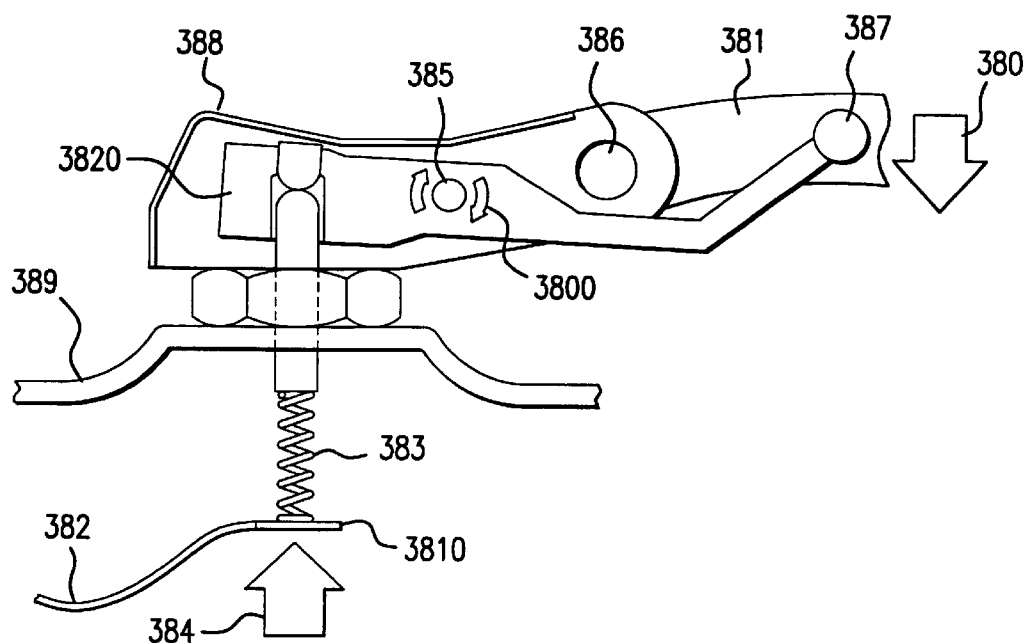
FIG. 38 shows an enlarged view of one end of a motor vehicle wiper arm in a relaxed state in accordance with an alternative embodiment of the present invention.

FIG. 38 is an enlarged view of the circled area in FIG. 37. In FIG. 38 the SMS coil 383 is shown in an energized state. Clearly evident in FIG. 38 are the wiper arm head 388, pivot pin 385, wiper blade pin 386, wiper arm 381, wiper blade connection 387, reaction arrow 380, rotation arrows 3800, force arrow 384, power supply line 382, SMS coil 383, and chassis 389.

Figure 39:
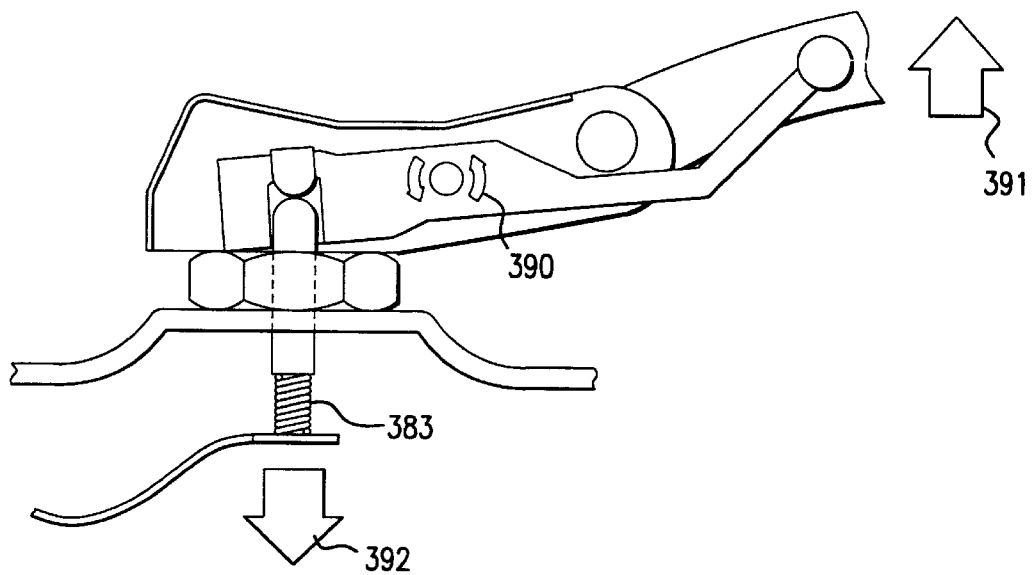
FIG. 39 shows an enlarged view of one end of a motor vehicle wiper arm in a compressed state in accordance with an alternative embodiment of the present invention.

FIG. 39 also provides an enlarged view of the circled area in FIG. 37. In FIG. 39 the SMS coil 383 is shown in a relaxed state. In FIG. 39, as the SMS coil 383 is shown in a relaxed state, the reaction arrow 391, rotation arrows 390, and force arrow 392 are opposite those in FIG. 38.

In use, in order to create an additional inward force by the wiper arm 381 against the windscreen once the motor vehicle has reached a minimum target speed, an electrical voltage may be applied to heating element 3810 in order to heat SMS coil 383. Upon being heated, the SMS coil 383, which contains an SMA, will expand and begin to place a force on the rocker arm 3820. The direction of this force is illustrated by arrow 384. This force causes the rocker arm 3820 to rotate as shown by rotation arrows 3800. As the rocker arm 3820 rotates a reaction force illustrated by reaction arrow 380 is generated. This reaction force urges the wiper blades into the windscreen and thus creates a greater contact force between the wiper blades (not shown) and the windscreen (not shown). Then, as the vehicle slows or the additional forces are no longer needed, the voltage will be removed and the SMS coil 383 may be allowed to relax back to its original length. No longer exerting a force against the rocker arm 3820, the arm will rotate back to its relaxed position under biasing forces generated by springs which are not shown.

Rather than using a heating coil 3810 to generate the thermal energy that will facilitate the expansion of the SMS coil 383, other methods of heating the SMS coil may also be employed. These methods include placing a voltage source directly in contact with the SMS coil 383 and allowing its internal electrical resistance to generate the heat needed to enlarge the coil or forcing thermal conduction fluid over and in contact with the SMS coil to provide the requisite thermal energy. The thermal conduction fluid may be engine oil pumped from the crank case and regulated by a valve controlled by a processor in the motor vehicle.

Figure 40:
FIG. 40 shows a motor vehicle wiper arm in accordance with an alternative embodiment of the present invention.

FIG. 40 provides an alternative embodiment wherein rather than pushing up on a rocker arm as described above, an SMS coil is placed within the wiper arm head to facilitate the urging of the wiper blades against the glass. In this embodiment, when additional inward force is required to keep the wiper blade against the glass, the SMS coil 403 may be heated via an electrical line, thereby causing it to shrink and create an additional inward force.

Figure 41:
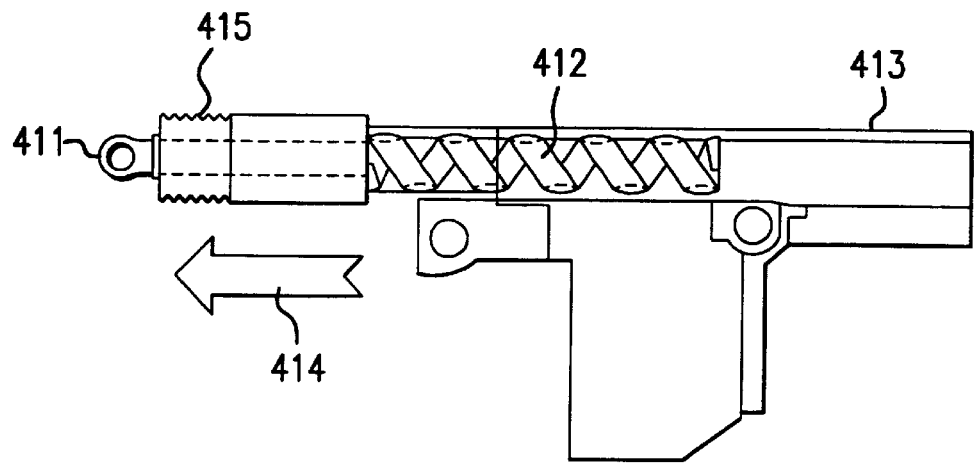
FIG. 41 shows a locking assembly in accordance with an alternative embodiment of the present invention.
Figure 42:
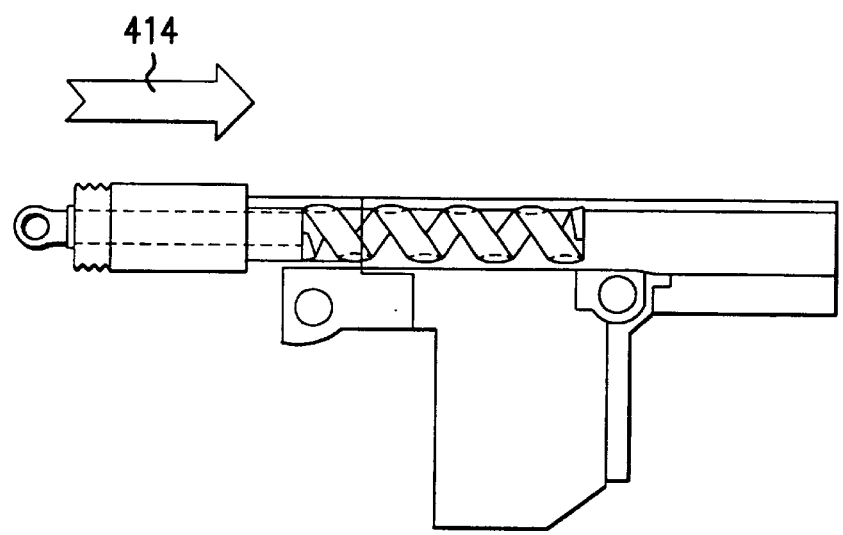
FIG. 42 shows a locking assembly in accordance with an alternative embodiment of the present invention.

FIGS. 41–42 provide a side view of an automobile power door lock assembly 413 in accord with another alternative embodiment of the present invention. These door locking assemblies 413 contain a locking head 411, an SMS coil 412, and a bushing 415. The SMS coil 412 may be used to slide the locking head 411 back and forth as indicated by arrows 414. The SMS coil 412 may be activated by applying a voltage to it or otherwise heating it. Upon being heated the SMS coil 412 may expand and urge the locking head 411 into one position. Once the heat is removed from the SMS coil 412 a biasing force generated by the bushing 415 may urge the locking head 411 back to its original position. Alternatively, in another embodiment, two SMS coils may be used to move the locking head back and forth. In this alternative embodiment an ongoing current need not be sustained to maintain the SMS coil in an extended position to resist the biasing force of the bushing.

Figure 43:
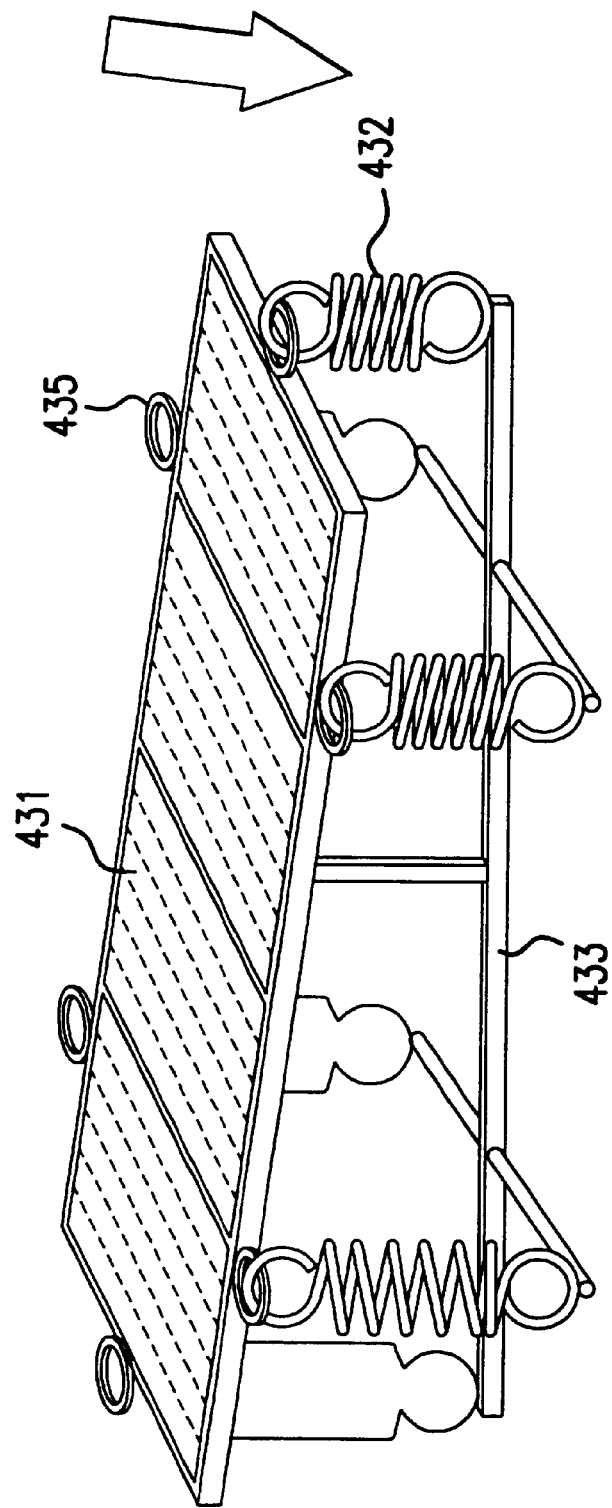
FIG. 43 shows a solar array mounted to shape memory alloy supports in accordance with an alternative embodiment of the present invention.

FIGS. 43 provides a moveable solar array in accord with another alternative embodiment of the present invention. In this embodiment a solar array 431 is pivotably mounted on a frame 433 and is moveable via SMS coils 432. These SMS coils are in optical communication with focusing lenses 435. These focusing lenses may be positioned as to focus the ambient rays of the sun onto the SMS coils 432. These focusing lenses 435 and SMS coils 432 work in unison with each other to rotate the face of the solar array in conjunction with the movement of the Sun caused by the Earth's rotation. As the Sun moves across the sky its rays will non-uniformly heat the various SMS coils 432 supporting the solar array. Thus, the SMS coils that receive more of the Sun's rays will be heated to a greater degree and will shrink, thereby pulling the face of the solar array towards the Sun. Then, as the Sun moves across the sky, its rays will reach the SMS coils 432 in increasing and decreasing intensities causing the face of the array to rotate and track it across the sky. In short, when one SMS coil 432 receives more light its downward forces will increase while another SMS coil 432 will receive less light, thereby reducing its downward pulling forces.

The focusing lenses 435 may be used to increase the intensity of the radiant energy reaching the coils. Alternatively, when the amount of light reaching the solar array is large enough, as may be the case in ceratin equatorial regions or in outer space, the focusing lenses may not be needed.

Figure 44:
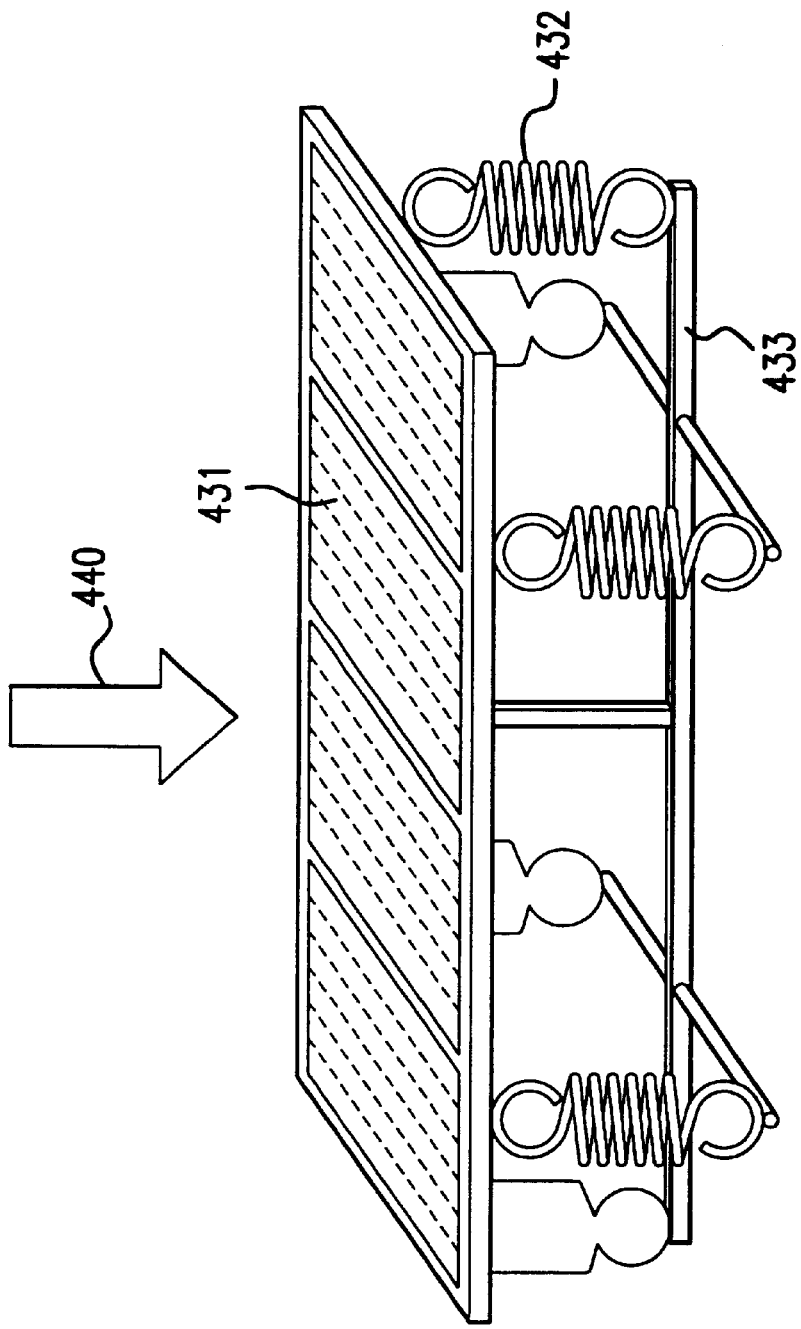
FIG. 44 shows a solar array mounted to shape memory alloy supports in accordance with an alternative embodiment of the present invention.

FIG. 44 provides an alternative embodiment wherein the focusing lenses 435 have not been employed as may be used in a self-adjusting satellite solar array.

What is claimed is:

1. A retractable aircraft landing gear system comprising:
   a shape memory structure,
      the shape memory structure changeable from a first length to a second length,
      the shape memory structure containing a shape memory alloy;
   a shape memory structure activation line coupled to the shape memory structure;
   a landing gear moveable from a first position to a second position; and
   a link coupling the landing gear to the shape memory structure.

2. The retractable aircraft landing gear system of claim 1 further comprising:
   a locking latch positioned to engage the landing gear when the landing gear is in a retracted position.

3. The retractable aircraft landing gear system of claim 2, further comprising:
   a cable connected to the locking latch,
      the cable slidable from a first position to a second position.

4. The retractable aircraft landing gear system of claim 1 wherein the shape memory structure activation line is an electrical line.

5. The retractable aircraft landing gear system of claim 1 wherein the shape memory structure encloses the shape memory alloy.

6. The retractable aircraft landing gear system of claim 1 wherein the shape memory structure is made with the shape memory alloy.

7. The retractable aircraft landing gear system of claim 1 wherein the shape memory structure activation line is a conduit.

8. The retractable aircraft landing gear system of claim 7 further comprising:
   a fluid pump connected to the conduit,
      the pump adapted to force heated fluid through the conduit to the shape memory structure.

9. The retractable aircraft landing gear system of claim 8 wherein the heated fluid is in a liquid phase.

10. The retractable aircraft landing gear system of claim 8 wherein the heated fluid is in a gaseous phase.

11. The retractable aircraft landing gear system of claim 8 wherein the heated fluid is oil.

12. The retractable aircraft landing gear system of claim 8 wherein the heated fluid is water.

13. A method of retracting aircraft landing gear comprising:
   activating a shape memory alloy,
      the shape memory alloy being activated via a shape memory alloy activation line in contact with the shape memory alloy,
      the shape memory alloy being moveable from a first length to a second length,
      the shape memory alloy linked to a landing gear, the landing gear moveable from a first position to a second position; and
   maintaining the landing gear in the second position after the activation of the shape memory alloy.

14. The method of claim 13 further comprising:
   locking the landing gear in predetermined position.

15. The method of claim 13 wherein the shape memory alloy is activated by raising its temperature with thermal energy carried by a fluid.

16. The method of claim 13 wherein the shape memory alloy is activated by raising its temperature with thermal energy cleated through resistance to electrical current flow.

17. The method of claim further comprising:
   locking the landing gear in a predetermined position; and
   de-activating the shape memory alloy.

18. The method of claim 17 further comprising:
   unlocking the landing gear by opening a locking latch.

19. The method of claim 13, wherein the fluid is oil.

20. The method of claim 13 wherein the fluid is in a gaseous phase.

* * * * *